(12) United States Patent
Iwano

(10) Patent No.: US 8,368,687 B2
(45) Date of Patent: *Feb. 5, 2013

(54) IMAGE GENERATING APPARATUS AND IMAGE GENERATING METHOD

(75) Inventor: Hirotaka Iwano, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 1196 days.

This patent is subject to a terminal disclaimer.

(21) Appl. No.: 11/902,951

(22) Filed: Sep. 26, 2007

(65) Prior Publication Data

US 2008/0129756 A1 Jun. 5, 2008

(30) Foreign Application Priority Data

Sep. 26, 2006 (JP) ................................ 2006-260425

(51) Int. Cl.
*G06T 15/00* (2011.01)

(52) U.S. Cl. .......... 345/419; 345/619; 345/629; 348/42; 348/51

(58) Field of Classification Search .................. 382/104; 348/148, 118
See application file for complete search history.

(56) References Cited

U.S. PATENT DOCUMENTS

| | | | | |
|---|---|---|---|---|
| 7,583,307 B2* | 9/2009 | Oikawa et al. | ........... | 348/333.01 |
| 2001/0005204 A1* | 6/2001 | Matsumoto et al. | .......... | 345/418 |
| 2002/0034316 A1* | 3/2002 | Ishii et al. | ..................... | 382/104 |
| 2002/0145663 A1* | 10/2002 | Mizusawa et al. | ............ | 348/118 |
| 2003/0156187 A1* | 8/2003 | Gluckman et al. | ............... | 348/46 |
| 2004/0201587 A1* | 10/2004 | Mizusawa | ...................... | 345/427 |
| 2005/0030380 A1* | 2/2005 | Oizumi | ......................... | 348/148 |
| 2005/0031169 A1* | 2/2005 | Shulman et al. | .............. | 382/104 |
| 2005/0129325 A1* | 6/2005 | Wu | ................................ | 382/254 |
| 2005/0200700 A1* | 9/2005 | Schofield et al. | ............. | 348/148 |
| 2006/0110008 A1* | 5/2006 | Vertegaal et al. | ............. | 382/103 |
| 2006/0111811 A1* | 5/2006 | Okamoto et al. | ............. | 700/214 |
| 2006/0132916 A1* | 6/2006 | Oikawa et al. | ................ | 359/463 |
| 2006/0171028 A1* | 8/2006 | Oikawa et al. | ................ | 359/463 |
| 2006/0192660 A1* | 8/2006 | Watanabe et al. | ............. | 340/435 |
| 2006/0291698 A1* | 12/2006 | Oizumi | ......................... | 382/104 |
| 2007/0198189 A1* | 8/2007 | Herbin et al. | .................. | 701/300 |

FOREIGN PATENT DOCUMENTS

| | | |
|---|---|---|
| JP | 3286306 | 3/2002 |
| JP | 2004-032464 | 1/2004 |
| JP | 2005-236493 | 9/2005 |

\* cited by examiner

*Primary Examiner* — Xiao M. Wu
*Assistant Examiner* — Phi Hoang
(74) *Attorney, Agent, or Firm* — Dickstein Shapiro LLP

(57) ABSTRACT

An image generating apparatus, which generates monitor image data from camera image data through a viewpoint transformation, includes a rear camera 1, an image processing controller 2, and a monitor 3. The image processing controller 2 sets a first virtual camera by viewpoint shift to have a downward viewpoint from a higher position than that of the rear camera 1, and sets a second virtual camera by rotating a viewpoint thereof upward or downward from the viewpoint of the rear camera 1, and generates the monitor image data of a close view viewed from the first virtual camera, and of an intermediate-to-distant view viewed from the second virtual camera, from the single camera image data captured by the rear camera 1. The monitor 3 displays a synthesis image in which a downward view of the close view and a perspective image of the intermediate-to-distant view are synthesized.

9 Claims, 8 Drawing Sheets

REAL CAMERA IMAGE

VIEWPOINT TRANSFORMATION

CASE WHERE PROJECTION PLANE ANGLE IS LARGE (LARGE $\alpha$)

CASE WHERE PROJECTION PLANE ANGLE IS SMALL (SMALL $\alpha$)

CASE WHERE IMAGING PLANE ANGLE IS LARGE (LARGE $\beta$)

CASE WHERE IMAGING PLANE ANGLE IS SMALL (SMALL $\beta$)

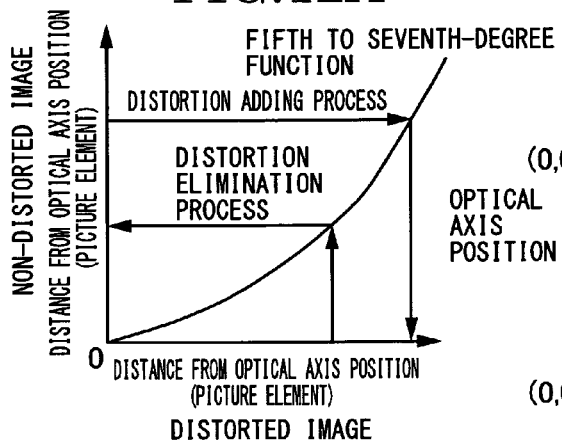
FIG.12A
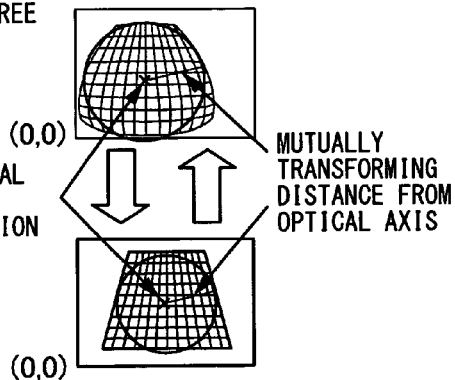
FIG.12B
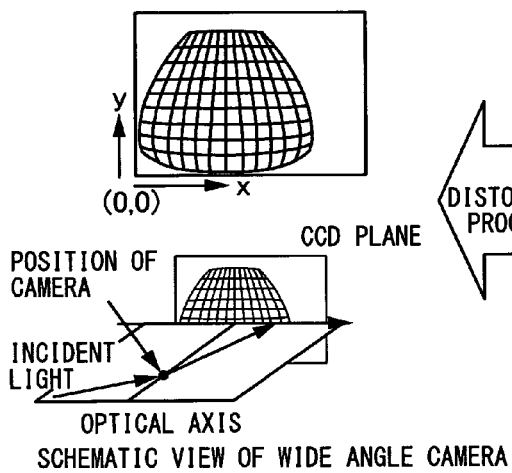
FIG.13A
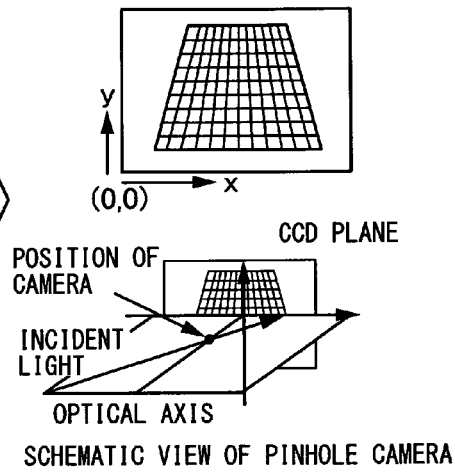
FIG.13B
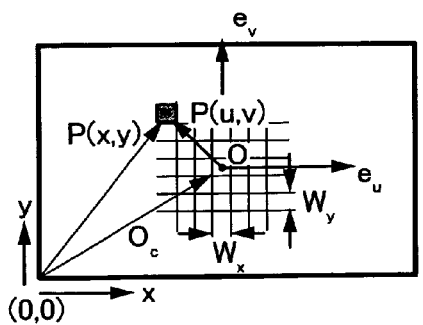
FIG.14A
FIG.14B
DIMENSIONLESS QUANTITY
P(x,y)
P(u,v)=$ue_u+ve_v$
QUANTITY IN REAL SPACE
(WORLD COORDINATE SYSTEM)

IMAGE GENERATING APPARATUS AND IMAGE GENERATING METHOD

CROSS REFERENCE TO RELATED APPLICATION

The present application is based on and claims priority from Japanese Application Number 2006-260425, filed with the Japanese Patent Office on Sep. 26, 2006, the disclosure of which is hereby incorporated by reference herein in its entirety.

BACKGROUND

The present invention relates to an image generating apparatus which generates monitor image data from camera image data through a viewpoint transformation using a virtual camera and a virtual projection plane, and to an image generating method.

As driving assistance devices, one disclosed in Japanese Patent Application Laid-Open Publication No. 2005-236493 has been heretofore known. The disclosed driving assistance device aims to provide a driver with an easy-to-understand image while changing a screen configuration and a viewpoint position in response to a move of a vehicle. To this end, the disclosed driving assistance device switches a single viewpoint image and a multi-viewpoint image in response to every move of the vehicle. The single viewpoint image is displayed as a downward view in which multiple camera images shot by multiple imaging devices are viewed from a single viewpoint, and the multi-viewpoint image is an image in which multiple camera images are respectively displayed on divided screens.

In addition, as conventional image generating apparatuses, one disclosed in Japanese Patent No. 3286306 has been known. This disclosed image generating apparatus synthesized multiple images shot by several cameras into a single image, and displays the single image instead of displaying the multiple images independently, so that a situation of the entire area shot by the several cameras can be intuitively grasped.

However, the driving assistance device described in Japanese Patent Application Laid-Open Publication No. 2005-236493 described above has a problem that a user is required to perform a selecting operation between the single viewpoint image and the multi-viewpoint image in order to grasp a situation around the vehicle. This operation is necessary because, the single viewpoint image shows only a close view by displaying a downward image, while the multi-viewpoint image shows only distant views by displaying camera images. In addition, since both of the single viewpoint image and the multi-viewpoint image are displayed by using multiple camera images, both types of images have problems that no continuity exists in a synthesis image and divided images, and that double shooting of the same image or image missing occurs.

The image generating apparatus described in Japanese Patent No. 3286306 is intended for displaying, as a single synthesis image, a situation of the entire area shot by the several cameras. Accordingly, in order to provide continuity to the synthesis image, the image generating apparatus needs to be provided with: a discriminative point extraction means for extracting discriminative points from multiple camera images, and a calibration means for calibrating a display image by using the multiple discriminative points. Consequently, the calculation processes for generating monitor image data become complicated. On the other hand, an absence of the discriminative point extraction means and the calibration means causes the problems of no continuity in a synthesis image, double shooting of the same image, and image missing.

SUMMARY

An object of the present invention is to provide an image generating apparatus and an image generating method, capable of generating monitor image data in which a downward display image of a close view and a perspective display image of an intermediate-to-distant view are seamlessly connected to each other, while simplifying calculation processes.

In order to accomplish the above object, an image generating apparatus of the invention comprises: a real camera which captures camera image data projected onto a single real imaging plane and ranging from a close view to a distant view; an image processing controller which sets a first virtual camera in which a viewpoint thereof is shifted so as to be located higher than a viewpoint of the real camera and to face ground, and sets a second virtual camera in which a viewpoint thereof is rotated from the viewpoint of the real camera so as to face upward or downward, and which generates, from the single camera image data captured by the real camera, monitor image data for the close view viewed from the first virtual camera and monitor image data for an intermediate view to the distant view viewed from the second virtual camera; and a monitor which displays a synthesis image in which a downward image of the close view projected by the monitor image data for the close view generated by the image processing controller and a perspective image of the intermediate view to the distant view projected by the monitor image data for the intermediate view to the distant view generated by the image processing controller are synthesized.

A mapping table may be generated by performing a coordinate transformation of a position of each picture element in an order of: designating one position of the picture element on a virtual imaging plane of the virtual camera; determining a first corresponding position on a virtual projection plane, corresponding to the designated one position of the picture element; and determining a second corresponding position on the imaging plane of the real camera, corresponding to the first corresponding position, and the image processing controller may perform a coordinate transformation, by using the mapping table, between the position of the each picture element of the single camera image data captured by the real camera and the position of the each picture element on the virtual imaging plane of the virtual camera.

A transformation relationship characteristic indicating a relationship between a distance of a picture element from an optical axis by a distorted image of the camera image data and a distance of a picture element from an optical axis by a non-distorted image of the camera image data may be determined in advance, and the image processing controller may correct a distortion of a coordinate system of the position of the each picture element of the single camera image data captured by the real camera, by using the distance of the each picture element from the optical axis and the transformation relationship characteristic, to transform it into a coordinate system of the virtual imaging plane.

The image processing controller may be connected with a virtual camera setting operation member which sets the virtual camera on an arbitrary spatial position in accordance with an external operation.

The image processing controller may be connected with a virtual stereoscopic projection plane setting operation member which arbitrarily sets an upward tilt angle of a screen for the distant view to a screen for the close view in accordance with an external operation.

The image processing controller may be connected with a virtual stereoscopic imaging plane setting operation member which arbitrarily sets a downward tilt angle of an imaging plane for the distant view to an imaging plane for the close view in accordance with an external operation.

The real camera may be a rear camera attached to a rear part of a vehicle and which images a view behind the vehicle.

In addition, the invention provides an image generating apparatus, comprising: a real camera which captures camera image data projected onto a single real imaging plane and ranging from a close view to a distant view; an image processing controller which sets a virtual camera at a position higher than the real camera, which sets a virtual stereoscopic projection plane, as a virtual projection plane from the virtual camera, including a close view screen set on ground and a distant view screen being connected to a side of the close view screen far from the real camera and set to have a predetermined upward tilt angle, which performs a coordinate transformation between a position of each picture element of the single camera image data captured by the real camera and a position of each picture element on a virtual imaging plane of the virtual camera through the virtual stereoscopic projection plane, which transfers the each picture element of the camera image data onto the virtual imaging plane of the virtual camera according to the coordinate transformation, and which generates monitor image data for obtaining a monitor image, the monitor image being as an image to be projected on the virtual imaging plane when the virtual stereoscopic projection plane is viewed from the virtual camera; and a monitor which displays a synthesis image in which a downward image of the close view and a perspective image of an intermediate view to the distant view projected by the monitor image data generated by the image processing controller are synthesized.

Furthermore, the invention provides an image generating apparatus, comprising: a real camera which captures camera image data projected onto a single real imaging plane and ranging from a close view to a distant view; an image processing controller which sets a virtual camera at a position higher than the real camera, which sets a virtual stereoscopic projection plane, as a virtual projection plane from the virtual camera, including a close view screen set on ground and a distant view screen being connected to a side of the close view screen far from the real camera and set to have a predetermined upward tilt angle, which sets a virtual stereoscopic imaging plane, as a virtual imaging plane of the virtual camera, including a close view imaging plane parallel to the close view screen and a distant view imaging plane connected to a side of the close view imaging plane near from the real camera and set to have a predetermined downward tilt angle, which performs a coordinate transformation between a position of each picture element of the single camera image data captured by the real camera and a position of each picture element on the virtual imaging plane of the virtual camera through the virtual stereoscopic projection plane, which transfers the each picture element of the camera image data onto the virtual stereoscopic imaging plane of the virtual camera according to the coordinate transformation, and which generates monitor image data for obtaining a monitor image, the monitor image being as an image to be projected on the virtual stereoscopic imaging plane when the virtual stereoscopic projection plane is viewed from the virtual camera; and a monitor which displays a synthesis image in which a downward image of the close view and a perspective image of an intermediate view to the distant view projected by the monitor image data generated by the image processing controller are synthesized.

An image generating method of the present invention comprises: capturing camera image data projected onto a single real imaging plane of a real camera and ranging from a close view to a distant view; setting a virtual camera at a position higher than the real camera; setting a virtual stereoscopic projection plane, as a virtual projection plane, including a close view screen set on ground and a distant view screen being connected to a side of the close view screen far from the real camera and set to have a predetermined upward tilt angle; performing a coordinate transformation between a position of each picture element of the single camera image data captured by the real camera and a position of each picture element on a virtual imaging plane of the virtual camera through the virtual stereoscopic projection plane; generating monitor image data for obtaining a monitor image, the monitor image being as an image to be projected on the virtual imaging plane when the virtual stereoscopic projection plane is viewed from the virtual camera, by transferring the each picture element of the camera image data onto the virtual imaging plane of the virtual camera according to the coordinate transformation; and displaying on a monitor a synthesis image in which a downward image of the close view and a perspective image of an intermediate view to the distant view projected by the generated monitor image data are synthesized.

A mapping table may be generated by performing a coordinate transformation of a position of each picture element in an order of: designating one position of the picture element on a virtual imaging plane of the virtual camera; determining a first corresponding position on a virtual projection plane, corresponding to the designated one position of the picture element; and determining a second corresponding position on the imaging plane of the real camera, corresponding to the first corresponding position, and a coordinate transformation, by using the mapping table, between the position of the each picture element of the single camera image data captured by the real camera and the position of the each picture element on the virtual imaging plane of the virtual camera may be performed.

A transformation relationship characteristic indicating a relationship between a distance of a picture element from an optical axis by a distorted image of the camera image data and a distance of a picture element from an optical axis by a non-distorted image of the camera image data may be determined in advance, and a distortion of a coordinate system of the position of the each picture element of the single camera image data captured by the real camera may be corrected, by using the distance of the each picture element from the optical axis and the transformation relationship characteristic, to transform it into a coordinate system of the virtual imaging plane.

The virtual camera may be set on an arbitrary spatial position in accordance with an external operation to a virtual camera setting operation member.

An upward tilt angle of a screen for the distant view to a screen for the close view may be set in accordance with an external operation to a virtual stereoscopic projection plane setting operation member.

A downward tilt angle of an imaging plane for the distant view to an imaging plane for the close view may be set in accordance with an external operation to a virtual stereoscopic imaging plane setting operation member.

The camera image data may be captured by a rear camera attached to a rear part of a vehicle and which images a view behind the vehicle.

Also, the invention provides an image generating method, comprising: capturing camera image data projected onto a single real imaging plane of a real camera and ranging from a close view to a distant view; setting a virtual camera at a position higher than the real camera; setting a virtual stereoscopic projection plane, as a virtual projection plane from the virtual camera, including a close view screen set on ground and a distant view screen being connected to a side of the close view screen far from the real camera and set to have a predetermined upward tilt angle; setting a virtual stereoscopic imaging plane, as a virtual imaging plane of the virtual camera, including a close view imaging plane parallel to the close view screen and a distant view imaging plane connected to a side of the close view imaging plane near from the real camera and set to have a predetermined downward tilt angle; performing a coordinate transformation between a position of each picture element of the single camera image data captured by the real camera and a position of each picture element on the virtual stereoscopic imaging plane of the virtual camera through the virtual stereoscopic projection plane; generating monitor image data for obtaining a monitor image, the monitor image being as an image to be projected on the virtual stereoscopic imaging plane when the virtual stereoscopic projection plane is viewed from the virtual camera, by transferring the each picture element of the camera image data onto the virtual stereoscopic imaging plane of the virtual camera according to the coordinate transformation; and displaying on a monitor a synthesis image in which a downward image of the close view and a perspective image of an intermediate view to the distant view projected by the generated monitor image data are synthesized.

BRIEF DESCRIPTION OF THE DRAWINGS

The above and other objects, features and advantages of the present invention will become more apparent from the following description when taken in connection with the accompanying drawings.

FIG. 12A is a view illustrating an example of a function of an amount of transformation to be used in a distortion correction.

FIG. 12B is a view illustrating a mutual transformation of a distance from an optical axis to be transformed by the amount of transformation being used in the distortion correction.

FIG. 13A is a schematic view of a wide angle camera illustrating a relationship between images before and after distortion processing, and a coordinate system.

FIG. 13B is a schematic view of a pinhole camera illustrating a relationship between images before and after the distortion processing, and a coordinate system.

FIG. 14A is a view illustrating a correlation between a virtual CCD picture element (x, y) and a world coordinate system (u, v).

FIG. 14B is a view illustrating mutual transformation of a dimensionless quantity and a quantity in a real space between the virtual CCD picture element (x, y) and the world coordinate system (u, v).

DETAILED DESCRIPTION

Figure 1:
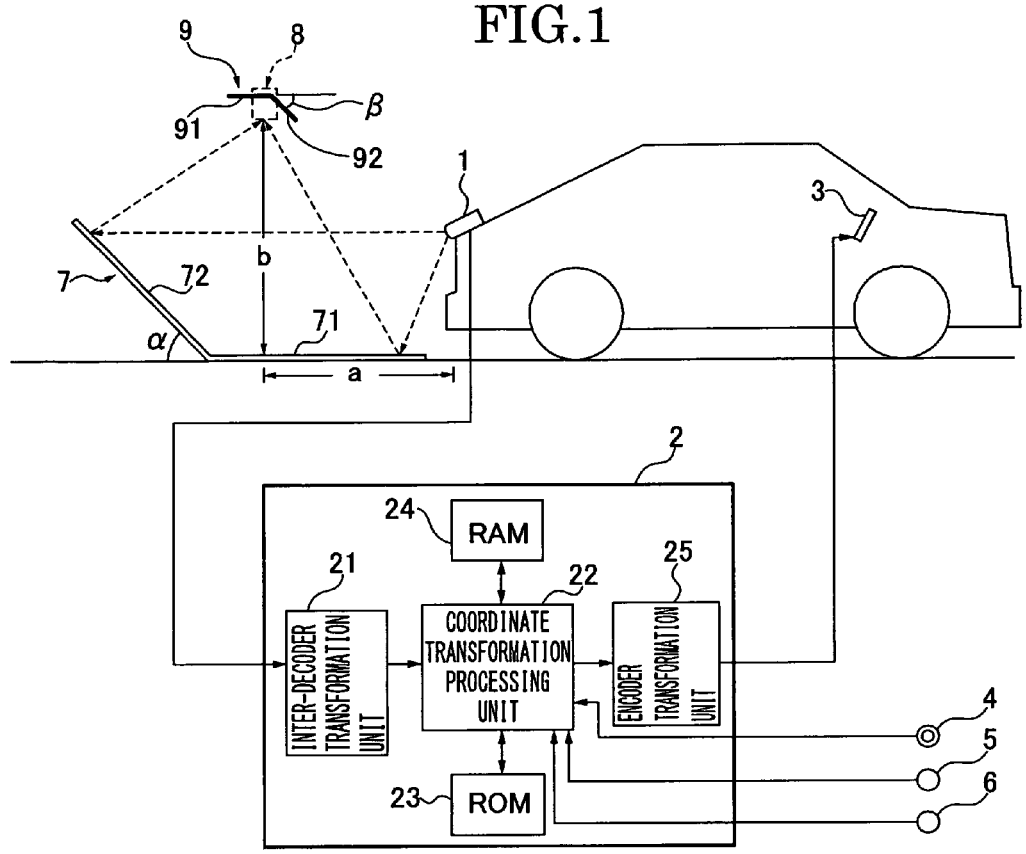
FIG. 1 is a view of an entire system illustrating an image generating apparatus applied to a rear camera of a vehicle of Embodiment 1.

Hereinafter, a best mode for attaining an image generating apparatus and an image generating method of the present invention will be described, on the basis of an embodiment 1 illustrated in the drawings.

Figure 2:
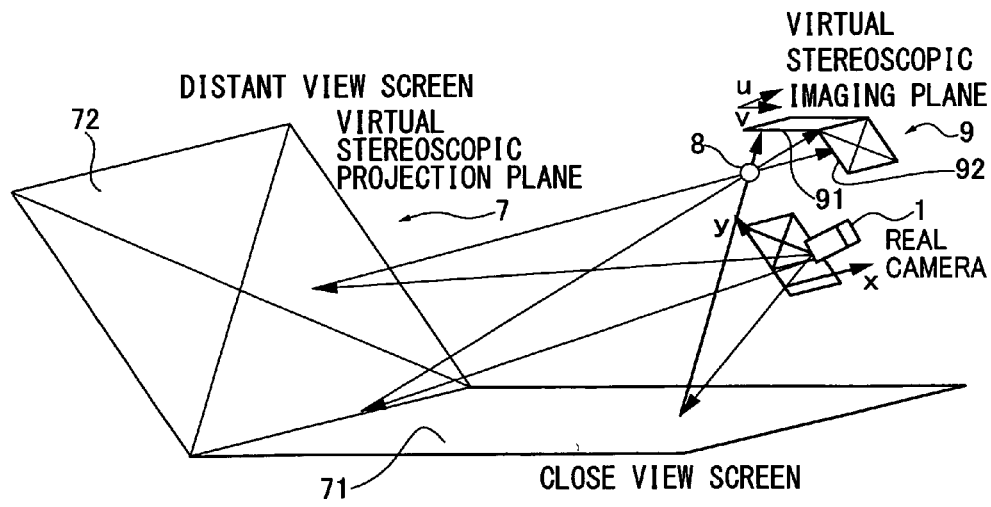
FIG. 2 is a schematic view for describing an example of a viewpoint transformation technique using a virtual stereoscopic projection plane and a virtual stereoscopic imaging plane in the image generating apparatus of the Embodiment 1.

First, a configuration will be described. FIG. 1 is a view illustrating an entire system of an image generating apparatus of the Embodiment 1, employed in a rear camera of a vehicle. FIG. 2 is a schematic view for describing an example of a viewpoint transformation technique using a virtual stereoscopic projection plane and a virtual stereoscopic imaging plane in the image generating apparatus of the Embodiment 1.

The image generating apparatus of the Embodiment 1 is a device which generates monitor image data from camera image data by a viewpoint transformation using a virtual camera and a virtual projection plane. As illustrated in FIG. 1, the image generating apparatus of the Embodiment 1 includes a rear camera 1 (a real camera), an image processing controller 2, a monitor 3, a virtual camera position adjustment operation knob 4 (a virtual camera setting operation member), a screen angle adjustment operation knob 5 (a virtual stereoscopic projection plane setting operation member), and an imaging plane angle adjustment operation knob 6 (a virtual stereoscopic imaging plane setting operation member).

As illustrated in FIG. 1, the rear camera 1 is attached to a rear position of the vehicle, and shows an image of a view behind the vehicle. This rear camera 1 captures camera image data using an image projected on a real imaging plane (a rear camera CCD).

As illustrated in FIGS. 1 and 2, on the side of an optic axis of this rear camera 1, a virtual stereoscopic projection plane 7 is set as the virtual projection plane, which includes a close view screen 71 set on the ground, and a distant view screen 72 connected to a portion of the close view screen 71 far from the rear camera 1 and set at a predetermined upward tilt angle α.

In addition, as illustrated in FIGS. 1 and 2, a virtual camera 8 is set on a position higher than the rear camera 1. The position of the virtual camera is defined by a distance a from the rear camera 1 in the horizontal direction, and a distance b from the ground in the vertical direction.

Moreover, a virtual stereoscopic imaging plane 9 is set as a virtual imaging plane of the virtual camera 8, as illustrated in FIGS. 1 and 2, which includes a close view imaging plane 91 parallel to the close view screen 71, and a distant view imaging plane 92 connected to a portion of the close view imaging plane 91 near the rear camera 1 and set at a predetermined downward tilt angle β.

The image processing controller 2 has an inter-decoder transformation unit 21, a coordinate transformation processing unit 22, a ROM 23, a RAM 24, and an encoder transformation unit 25.

The inter-decoder transformation unit 21 transforms a data coordinate system between two decoders of a decoder connected to the rear camera 1 and a decoder which is assumed to be used in the coordinate transformation processing unit 22. Specifically, a camera input coordinate system is transformed into a decoder transformation coordinate system on the basis of a difference between the two decoders. Here, the "decoder" indicates software for obtaining the original data from data encoded based on a certain rule, by restoring the encoded data.

The coordinate transformation processing unit 22 receives the decoder transformation coordinate system from the inter-decoder transformation unit 21 as camera image data captured by the rear camera 1. Then, the coordinate transformation processing unit transfers each picture element of the camera image data onto the virtual stereoscopic imaging plane 9 of the virtual camera 8 according to a coordinate transformation using a mapping table stored and set in the ROM 23 in advance. Thereafter, the coordinate transformation processing unit generates monitor image data for obtaining a monitor image, wherein the monitor image is an image projected on the virtual stereoscopic imaging plane 9 when the virtual stereoscopic projection plane 7 is viewed from the virtual camera 8.

The ROM 23 is a memory in which a mapping table is stored and set. The mapping table is generated by performing a coordinate transformation on the position of each picture element in a procedure of: designating the position of one picture element on the virtual stereoscopic imaging plane 9; determining a first corresponding position on the virtual stereoscopic projection plane 7, corresponding to the position of the designated picture element; and determining a second corresponding position on an imaging plane of the rear camera 1, corresponding to the first corresponding position.

When this mapping table is generated, a coordinate transformation is performed between the position of each picture element of a single set of camera image data captured by the rear camera 1, and the position of a corresponding picture element on the virtual stereoscopic imaging plane 9 of the virtual camera 8 through the virtual stereoscopic projection plane 7.

Further, in order to generate the mapping table, a transformation relationship characteristic indicating a relationship between a distance of a picture element from the optical axis in a distorted image and a distance of a picture element from the optical axis in a non-distorted image is determined in advance (refer to FIG. 12A). Then, a real coordinate system for the position of each picture element of a single set of camera image data captured by the rear camera 1 is transformed into a coordinate system of the virtual stereoscopic imaging plane 9 by correcting a distortion of the real coordinate system by use of the distance from the optical axis and the transformation relationship characteristic of each picture element.

Further, for the mapping table, depending on the position (a, b) of the virtual camera 8, the screen tilt angle α, and the imaging plane tilt angle β, a plurality of mapping tables are stored and set for every predetermined positional interval and for every predetermined angular interval, so that fine positional setting and fine angular setting can be managed by employing, for example, an interpolation technique.

The RAM 24 is a memory in which rewritable information is stored and set. The Embodiment 1 is an example in which a coordinate transformation process is performed using the mapping table. For example, if the system of the Embodiment 1 is internally provided with hardware capable of arithmetic processing at high speed, and generates the monitor image data while performing the coordinate transformation in real time, coordinate transformation equations of each picture element and the like are stored and set in this RAM 24.

The encoder transformation unit 25 transforms the monitor image data, having been generated by the coordinate transformation processing unit 22, into image data to be displayed on the monitor 3, while also performing, for example, a left-right reversal process for a driver's viewpoint. Here, the "encoder" indicates software for encoding data based on a certain rule.

The monitor 3 is set on an instrument panel or the like, and displays a synthesis image, composed of a downward display of a close view and of a perspective display (including images on the horizon) in the range from an intermediate view to a distant view, based on the image data from the image processing controller 2.

The virtual camera position adjustment operation knob 4 is an operation member with which the virtual camera 8 is set on an arbitrary spatial position by an external setting operation by the driver or other person. For this virtual camera position adjustment operation knob 4, the horizontal distance a (e.g., 2 m), from the rear camera 1, and the vertical distance b (e.g., 3 m), from the ground can be independently set.

The screen angle adjustment operation knob 5 is an operation member with which the upward tilt angle α of the distant view screen 72 to the close view screen 71 is arbitrarily set (e.g., in an angular range of 30 to 100 degrees) by an external setting operation by the driver or other person.

The imaging plane angle adjustment operation knob 6 is an operation member with which the downward tilt angle β of the distant view imaging plane 92 to the close view imaging plane 91 is arbitrarily set (e.g., in an angular range of 30 to 100 degrees) by an external setting operation by the driver or other person.

Next, an "image generating operation" will be described.

The image generating apparatus of the Embodiment 1 generates the monitor image data with a two-viewpoints transformation technique using the virtual camera 8, the virtual stereoscopic projection plane 7 and the virtual stereoscopic imaging plane 9, and thereby obtains a viewpoint shift image and a viewpoint rotation image, wherein, the viewpoint shift image is for a positioning assistance and safety confirmation assistance at the time of parking the vehicle, and the viewpoint rotation image is for safety confirmation assistance at the time of driving the vehicle backward.

More specifically, the rear camera 1 captures camera image data projected on the single real imaging plane, the camera image data on a range from a close view to a distant view. Then, in the image processing controller 2, the virtual camera 8 is set at a higher position than the position of the rear camera 1. The virtual stereoscopic projection plane 7 is set as the virtual projection plane from the virtual camera 8, the virtual stereoscopic projection plane including the close view screen 71 set on the ground, and the distant view screen 72 connected to a portion of the close view screen 71 far from the rear camera 1 and set at the predetermined upward tilt angle α. The virtual stereoscopic imaging plane 9 is set as the virtual imaging plane of the virtual camera 8, the virtual stereoscopic imaging plane including the close view imaging plane 91 parallel to the close view screen 71, and the distant view imaging plane 92 connected to a portion of the close view imaging plane 91 near the rear camera 1 and set at the predetermined downward tilt angle β. Further, in the image processing controller 2, the coordinate transformation is performed between the position of each picture element of the single set of camera image data captured by the rear camera 1, and the position of a corresponding picture element on the virtual stereoscopic imaging plane 9 of the virtual camera 8 through the virtual stereoscopic projection plane 7. According to this coordinate transformation, each picture element of the camera image data is mapped onto the virtual stereoscopic imaging plane 9 of the virtual camera 8, and the monitor image data are generated. The monitor image data are for obtaining an image to be projected on the virtual stereoscopic imaging plane 9 when the virtual stereoscopic projection plane 7 is viewed from the virtual camera 8. In addition, on the monitor 3, a synthesis image is displayed, the image being obtained by synthesizing the downward image of the close view, and the perspective image in the range from an intermediate view to the distant view. Both images are produced from the monitor image data generated by the image processing controller 2.

As described above, by performing the coordinate transformation, the monitor image data are generated from a single set of camera image data, which are captured by the rear camera 1. Consequently, unlike a conventional technology employing multiple sets of camera image data, extracting discriminative points and performing calibration to have continuity in a synthesis image is not necessary, and an arithmetic process in obtaining monitor image data having continuity can be simplified.

Further, when the close view screen 71 of the virtual stereoscopic projection plane 7 is viewed from the virtual camera 8, an image to be projected on the close view imaging plane 91 of the virtual stereoscopic imaging plane 9 becomes the downward image that the close view is viewed from above. Still further, when the distant view screen 72 of the virtual stereoscopic projection plane 7 is viewed from the virtual camera 8, an image to be projected on the distant view imaging plane 92 of the virtual stereoscopic imaging plane 9 becomes a perspective image that a view in the range from the intermediate position to the distant position (including images on the horizon) is viewed from obliquely above. In addition, since the close view screen 71 and the distant view screen 72 of the virtual stereoscopic projection plane 7 are integrally connected, and since the close view imaging plane 91 and the distant view imaging plane 92 of the virtual stereoscopic imaging plane 9 are integrally connected, no discrepancy occurs at all between overview representation data of the close view and perspective display data of the distant view. Consequently, monitor image data to be generated are seamlessly connected.

The monitor image, which is obtained using the above-described monitor image data, is an image obtained by synthesizing the downward image of the close view with which a distance can be easily recognized, and the perspective image in the range from an intermediate view to the distant view, with which a perspective can be easily recognized in the sense that a distant object is viewed to be small while a nearby object is viewed to be large; and this synthesis image can be displayed on the screen of the monitor 3.

For this reason, without performing a selective operation on a downward image and a camera image, or without shifting an eye line on divided monitor displays, or without doing something similar, of images displayed on a single monitor screen, a viewpoint shift image (a downward image) provides a positioning assistance and a safety confirmation assistance at the time when parking a vehicle, and a viewpoint rotation image (a perspective image) provides a safety confirmation assistance at the time when driving the vehicle backward.

Subsequently, "points of the embodiment of the present invention" will be described.

Points of the embodiment of the present invention are as follows:
1. The virtual projection plane (screen) is stereoscopically represented whereby the viewpoint transformation (the viewpoint shift and the viewpoint rotation) is performed, so that the downward display of the close view, and the perspective display (including images on the horizon) from the intermediate view to the distant view are seamlessly connected; and 2. An image design is adjusted in cooperation with a stereoscopic representation of the imaging plane of the virtual camera 8, thus providing easy view of a display using the synthesis image of the overview image and the perspective image on which a distortion correction is performed.

Accordingly, the virtual stereoscopic projection plane 7 is introduced, whereby the viewpoint transformation is performed also on images above the horizon using the virtual stereoscopic projection plane 7 so that what is in the item 1 described above is achieved. Further, the shape of the virtual stereoscopic projection plane 7 and the shape of the virtual stereoscopic imaging plane 9 are coupled, whereby the flexibility of the design of the downward image is increased so that what is in the item 2 described above is achieved.

Details of the viewpoint transformation technique will be given in the description of a "viewpoint transformation technique using a virtual stereoscopic screen," to be described later, and an outline thereof is only given here.

A schematic view of the Embodiment 1 illustrated in FIG. 2 is a configuration in which the real camera image is projected on the virtual stereoscopic projection plane 7 (screen) including the close view screen 71 and the distant view screen 72, and the image is shot on the virtual stereoscopic imaging plane 9 of the virtual camera 8. This configuration enables a viewpoint transformation in which images above the horizon are also projected on the distant view screen 72.

A feature of the invention depicted in the Embodiment 1 resides in that the virtual stereoscopic projection plane 7 and the virtual stereoscopic imaging plane 9 are set so that both of the planes are coupled, or set independently, whereby the flexibility of viewpoint transformation can be increased. Examples are described below.

[Case Where the Virtual Stereoscopic Projection Plane 7 and the Virtual Stereoscopic Imaging Plane 9 are in Parallel to Each Other]

Case where the planes are also parallel to the imaging plane of the rear camera 1

In this case, on the virtual stereoscopic projection plane 7 and the virtual stereoscopic imaging plane 9, the same image as that of the rear camera 1 is projected (excluding an effect of lens distortion), so that an image to be eventually obtained is displayed by continuously connecting the downward image of the close view and the real camera image of the intermediate-to-distant view.

Case where the planes are not parallel to the imaging plane of the rear camera 1

In this case, while the downward image of the close view is displayed as-is, an image of an intermediate-to-distant view is displayed as if the rear camera 1 is rotated upward or downward. For example, when the distant view screen 72 is perpendicular to the close view screen 71 ($\alpha=90°$), the view is deformed and displayed as if the rear camera 1 is horizontally set. Further, when the distant view screen 72 is set to the close view screen 71 at an angle larger than a perpendicular angle ($\alpha<90°$), the view is deformed and displayed as if the rear camera 1 is set slightly downward than horizontally. That is, with respect to images of the intermediate-to-distant view, the perspective image can be obtained by the same effect as that in which the real camera is attached at an arbitrary angle by the viewpoint rotation. With respect to the close view, the downward view having continuity with the perspective image is displayed.

[Case Where the Virtual Stereoscopic Projection Plane 7 and the Virtual Stereoscopic Imaging Plane 9 are Independently Set]

Figure 3A:
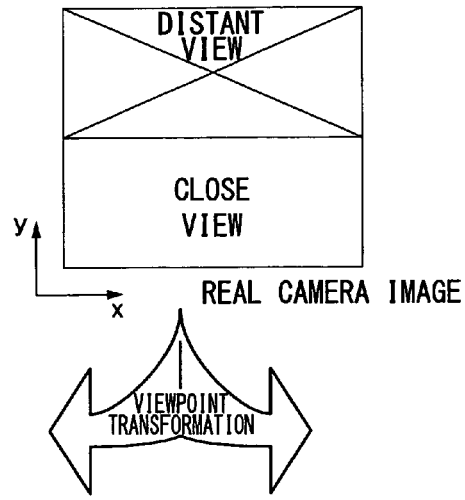
FIG. 3A is a schematic view illustrating a real camera image before a viewpoint transformation from the real camera image is performed in the image generating apparatus of the Embodiment 1.

Case where an angle formed by the two planes of the virtual stereoscopic projection plane 7 is changed When the angles $\alpha$ and $\beta$ formed by two planes of the virtual stereoscopic projection plane 7 and the virtual stereoscopic imaging plane 9 are set to certain angles (e.g., $\alpha=45°$, $\beta=45°$), as illustrated in FIG. 3A, the downward image of the close view is displayed on a lower part of the screen, and the perspective image of the intermediate-to-distant view is displayed on an upper part of the screen. The downward image and the perspective image are displayed as parallel setting image which is seamlessly synthesized. Meanwhile, FIGS. 3B and 3C illustrate examples on two types of viewpoint transformations in which the angle $\alpha$ formed by two planes of the virtual stereoscopic projection plane 7 is changed while retaining the angle $\beta$ to be fixed, the angle $\beta$ being formed by two planes of the virtual stereoscopic imaging plane 9.

Figure 3B:
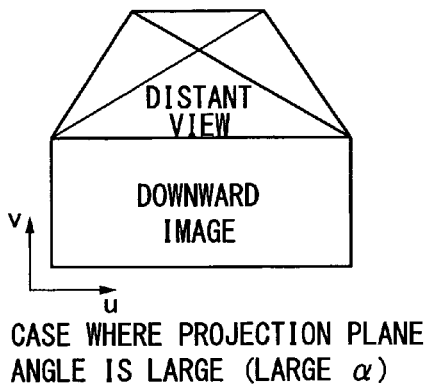
FIG. 3B is a schematic view illustrating a monitor image after the viewpoint transformation from the real camera image is performed in the case where a projection plane angle is large, in the image generating apparatus of the Embodiment 1.
Figure 3C:
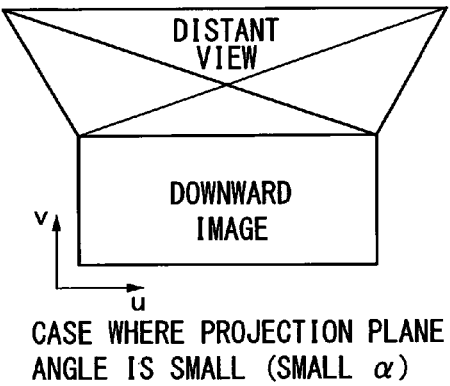
FIG. 3C is a schematic view illustrating a monitor image after the viewpoint transformation from the real camera image is performed in the case where the projection plane angle is small, in the image generating apparatus of the Embodiment 1.

FIG. 3B illustrates an example of the viewpoint transformation in which the angle $\alpha$ of the virtual stereoscopic projection plane 7 is set larger than that of FIG. 3A. FIG. 3C illustrates another example of the viewpoint transformation in which the angle $\alpha$ of the virtual stereoscopic projection plane 7 is set smaller than that of FIG. 3A so that the virtual stereoscopic projection plane 7 is in approximately horizontal position.

The case of FIG. 3B where the angle of the projection plane is larger illustrates an image in design in which the distant view part is displayed to be smaller so that a display of the perspective is more emphasized. Meanwhile, the case of FIG. 3C where the angle of the projection plane is smaller illustrates an image that a "partition (virtual stereoscopic projection plane 7)" is viewed obliquely from above, and the image provides a design which gives a stereoscopic effect. In any one of the above-described cases, a perspective effect is given to a parallel setting image in the case where the virtual stereoscopic projection plane 7 and the virtual stereoscopic imaging plane 9 are parallel to each other.

Figure 3D:
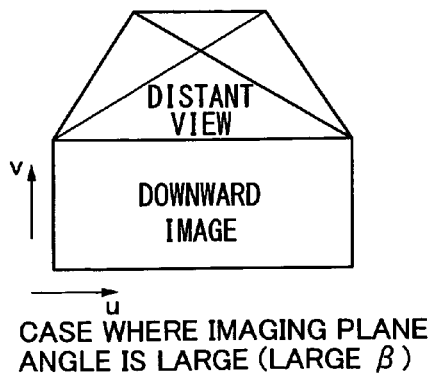
FIG. 3D is a schematic view illustrating a monitor image after the viewpoint transformation from the real camera image is performed in the case where an imaging plane angle is large, in the image generating apparatus of the Embodiment 1.
Figure 3E:
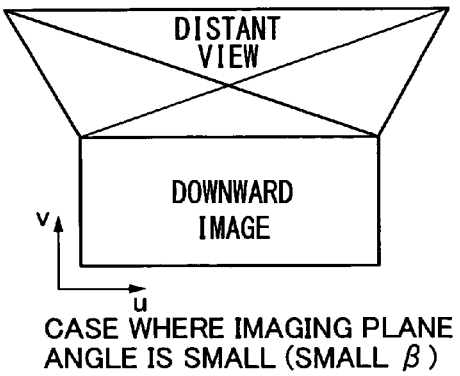
FIG. 3E is a schematic view illustrating a monitor image after the viewpoint transformation from the real camera image is performed in the case where the imaging plane angle is small, in the image generating apparatus of the Embodiment 1.

Case where the angle formed by two planes of the virtual stereoscopic imaging plane 9 is changed In contrast to FIG. 3A in which the angles $\alpha$ and $\beta$ formed by two sets of two planes of the virtual stereoscopic projection plane 7 and the virtual stereoscopic imaging plane 9 are set to certain angles, FIGS. 3D and 3E illustrate examples on two types of viewpoint transformations in which the angle $\beta$ formed by two planes of the virtual stereoscopic imaging plane 9 is changed while retaining the angle $\alpha$ to be fixed, the angle $\alpha$ being formed by two planes of the virtual stereoscopic projection plane 7.

FIG. 3D illustrates an example of the viewpoint transformation in which the angle $\beta$ of the virtual stereoscopic imaging plane 9 is set larger than that of FIG. 3A, and FIG. 3E illustrates another example of the viewpoint transformation in which the angle $\beta$ of the virtual stereoscopic imaging plane 9 is set smaller than that of FIG. 3A so that the virtual stereoscopic imaging plane 9 is in approximately horizontal position.

The case of FIG. 3D where the angle of the projection plane is larger illustrates an image in design in which the distant view part is displayed to be smaller so that a display of a perspective is more emphasized. Meanwhile, the case of FIG. 3E where the angle of the projection plane is smaller illustrates an image that the "partition (virtual stereoscopic projection plane 7)" is viewed obliquely from above, and the design of the image gives the stereoscopic effect. In any one of the above-described cases, the perspective effect is given to a parallel setting image in the case where the virtual stereoscopic projection plane 7 and the virtual stereoscopic imaging plane 9 are parallel to each other.

As described above, in the Embodiment 1, the seamless display of the downward image of the close view and the perspective image of the intermediate-to-distant view (including images on and above the horizon) is enabled. Further, the angles α and β of the virtual stereoscopic projection plane 7 and the virtual stereoscopic imaging plane 9 are controlled with respect to the display, so that the flexibility of design can be increased. To be more specific, with respect to an image of an intermediate-to-distant view, the following can be controlled:

an effect in which an attaching elevation angle of the real camera is arbitrary changed; and a correction effect of the perspective produced by the giving of the perspective effect.

Next, a "viewpoint transformation technique using the virtual stereoscopic screen (in the case of a two-dimensional model)" will be described.

1. Background and Object

For an in-vehicle periphery monitor, there has been a demand from the beginning of development that a display of a downward view of a rear camera image, and an ordinary camera image are simultaneously displayed on the in-vehicle periphery monitor. To satisfy this demand, images have been shown through two-screen display when commercialization or demonstration of a product is made. Although outsiders sometimes have requested one-screen display, serious studies have been left out partly because there has been some doubt whether it is easy to view in practice.

On the present study of a "New Way of Displaying," the same demand as described above is also included in topics to be studied. In addition, the topics to be studied also include contents, which cannot be solved by the conventional viewpoint transformation techniques, such as the displaying of images on the horizon other than the ground, through a viewpoint transformation. In order to satisfy these demands all together, it has been decided that a highly extendable technique is to be newly developed by entirely changing a viewpoint transformation algorithm. A virtual stereoscopic screen technique to be described below is one of the results out of the study.

A feature of this technique resides in that a virtual screen, which has been heretofore set on the ground, is formed as a stereoscopic virtual screen having a three-dimensional shape. Compared with conventional techniques, this technique differs from these techniques only in screen shape from a conceptual point of view, so it is an expansion that is easy to be understood. However, an algorithm to be implemented is completely different. This is because, based on the assumption of a specific plane, a simple algorithm has been heretofore used in which the same matrices are made to operate on all picture elements. However, to cope with a screen of arbitrary shape, a transformation equation possibly changes for every picture element, so that, for each time, a corresponding point is sought.

A first object of the following description is to sort out and release this technique. Incidentally, the shape of a stereoscopic screen is highly arbitrary. In the following description, only one example is described. However, in the following description, a group of basic equations, which are necessary for calculating corresponding points, are sorted out and presented, and this group of basic equations is expected to be applied to screens of other shapes. A second object of the following description is to comprehensively review a group of coordinate transformations which are necessary to implement the viewpoint transformation, and to sort out and present individual technologies. Since information of this kind represents peripheral-technical contents, no document has been heretofore available, and such information remains only in program codes in embedded form. However, since the procedure is complex to some extent, an obstacle arisen in implementation is hard to be overcome even when the principle of the viewpoint transformation is understood. In the latter half of the description, a group of necessary coordinate transformations are described.

2. Introduction to Stereoscopic Screen

Figure 4A:
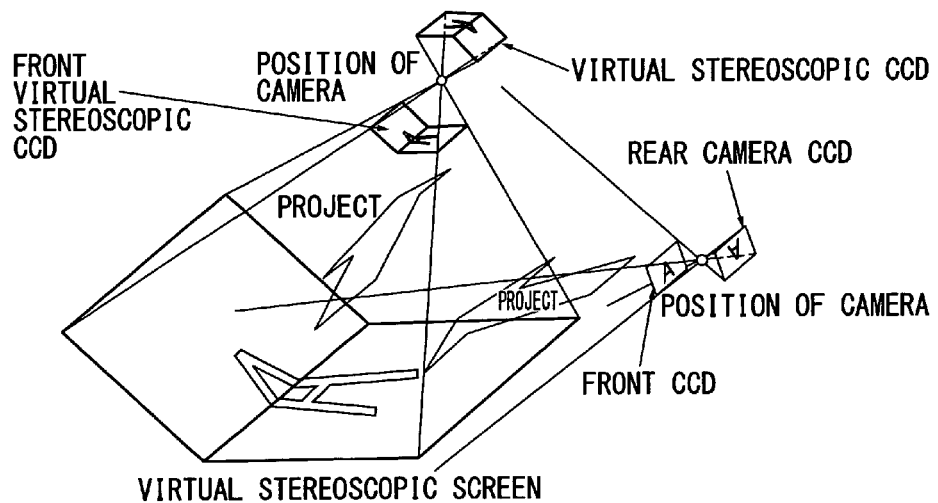
FIG. 4A is an entire diagrammatic view illustrating a viewpoint transformation using a virtual stereoscopic screen and a virtual stereoscopic CCD.

FIG. 4A illustrates a concept of the viewpoint transformation using the stereoscopic screen. Arrows illustrated in FIG. 4A represent a flow of light on the concept. An image shot by the rear camera is projected on an external screen, and the image on the screen is shot by the virtual CCD. In this drawing, a base of the viewpoint transformation is to find a correspondence between the virtual CCD picture element and the rear camera CCD picture element. If a stereoscopic screen having the same shape as a real substance were prepared, an image shot from a virtual position should be the same as an image obtained by shooting the substance from the virtual position. As a matter of course, an image on a blind area viewed from the rear camera CCD remains lost.

The stereoscopic screen illustrated in FIG. 4A has a shape configured of two planes. Hence, the stereoscopic screen has a flexibility to a considerable degree as compared with the case where a virtual screen has no flexibility if the ground is selected. Because of such flexibility, it is difficult to formulate the screen shapes of all types of the stereoscopic screen. An example of a two-planes screen which is the same as that of FIG. 4A will be described below, whereby its basic concept and a configuration technique will be described.

Figure 4B:
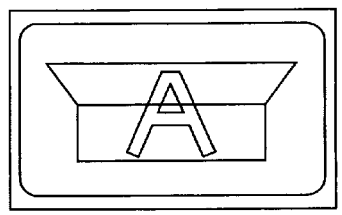
FIG. 4B is an entire view illustrating how an image is viewed after the viewpoint transformation is performed using the virtual stereoscopic screen and the virtual stereoscopic CCD.
Figure 4C:
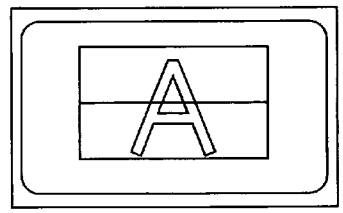
FIG. 4C is an entire view illustrating how an image is viewed after the viewpoint transformation is performed using the virtual stereoscopic screen and the virtual stereoscopic CCD.

In addition, as illustrated in FIGS. 4B and 4C, consideration is also made that there are some cases where the virtual CCD is stereoscopically represented. A main object of this concept of the virtual stereoscopic CCD is originally to eliminate a perspective occurring in the stereoscopic screen. FIG. 4B is a view illustrating an example of an image on the virtual plane CCD in parallel to the ground, and the image is displayed on the screen together with a perspective on a stereoscopic region of the screen. To eliminate the perspective, an image only on this stereoscopic region needs to be generated by using a CCD in parallel to the stereoscopic screen. Consequently, the stereoscopic CCD shown in the drawing has been introduced. FIG. 4C is a view illustrating how the image can be viewed through the virtual stereoscopic CCD.

When the problem of the perspective occurring on the stereoscopic screen is only concerned, another solving technique may be developed. However, the reason why the above-described concept has been introduced is to cope with all problems with a single concept. The virtual stereoscopic CCD in the drawing is one that the stereoscopic screen has been scaled down. For this point only, the above concept on the CCD is not necessary. However, when strongly seeking the effect shown in FIG. 4C, a different CCD shape needs to be used. To handle such a diversity using a single concept, the virtual screen and the virtual CCD are defined as independent concepts.

3. Transformation Procedure

A transformation procedure is opposite to the arrows of FIG. 4A. That is, one point on the virtual stereoscopic CCD is designated: a corresponding point on the stereoscopic screen and a corresponding point on the rear camera CCD are found in this procedure. This is to seek corresponding points of the entire picture elements of an outputted image. Incidentally, on a coordinate system on the CCD plane, practical image processing is to consider the image processing in the coordinate system digitized by an encoder/decoder and the like. On the other hand, a machine dependency will come up so that it becomes difficult to be applied. Consequently, in the present description, a series of transformation procedures is described by use of a general coordinate system. To be used for a machine of specific type, an example using PICASSO will be described in the next chapter.

3.1 Definition of World Coordinate System

Figure 5A:
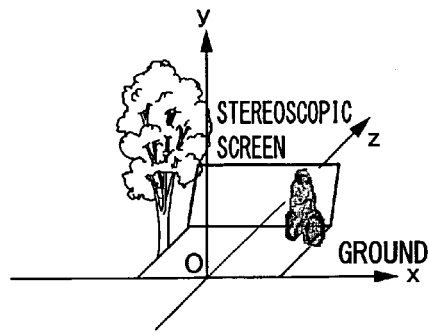
FIG. 5A is a view illustrating a world coordinate system in which the virtual screen is represented by a stereoscopic screen.
Figure 5B:
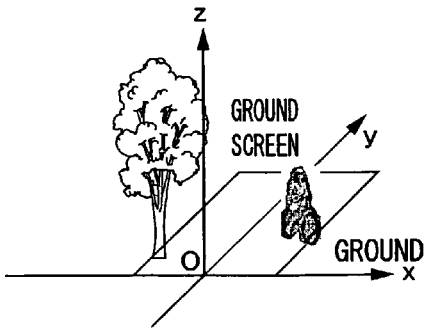
FIG. 5B is a view illustrating a world coordinate system in which the virtual screen is represented by a ground screen.

The world coordinate system to be used in the present description uses a coordinate system of FIG. 5A, which is frequently used in three-dimensional graphics system. Since y-axis and z-axis of this coordinate system are switched in a coordinate system (FIG. 5B) in which the ground represents a screen, special attention is necessary for performing successive operations.

3.2 Determination of Virtual CCD Plane

Figure 6A:
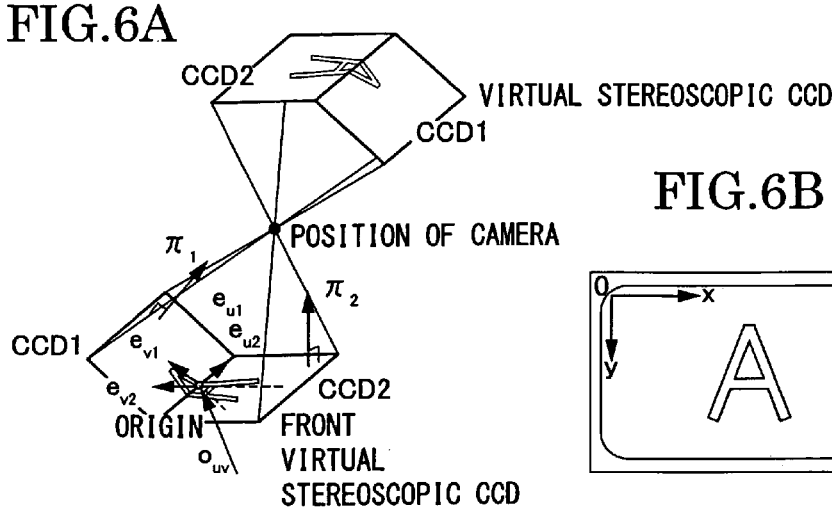
FIG. 6A is a perspective view schematically illustrating the virtual stereoscopic CCD.
Figure 6B:
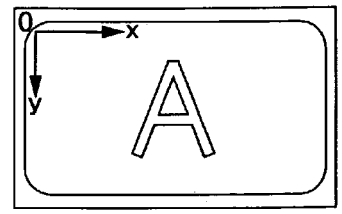
FIG. 6B is an example of a monitor display of the virtual stereoscopic CCD.

As described, at the beginning, on a definition of the virtual stereoscopic CCD, the virtual stereoscopic CCD is configured with a plurality of plane CCDs. Although there are several methods for the representation of the position of a picture element within a plane CCD, uv vectors are hereinafter used for the representation. One example is illustrated in FIG. 6A. In terms of optics, the virtual stereoscopic CCD behind the camera in the drawing represents an original CCD plane. Considering easiness of processing, however, in this description, it is discussed on a front virtual stereoscopic CCD that the CCD plane is rotated with respect to the camera position. For this reason, basis vectors {eu, ev} of the uv vectors are also defined on that plane. Incidentally, for a plurality of planes, the uv-basis vectors are set for each plane. For this example, the multiple uv-basis vectors are given by {eu1, ev1} and {eu2, ev2}. In addition, these basis vectors are vectors defined in the world coordinate system. Using these basis vectors, the position of a picture element on each CCDi plane is given by, $$u \cdot e_{u1} + v \cdot e_{v1} + o_{uv} \text{ for CCD1} \quad (1)$$

$$u \cdot e_{u2} + v \cdot e_{v2} + o_{uv} \text{ for CCD2} \quad (2)$$

Ouv is the position vector representing the position of the origin in the world coordinate system. A mutual transformation between coordinates (x, y) and coordinates (u, v) in a monitor display is a transformation from a two-dimensional image to another two-dimensional image, and this will be left to a designer. One embodiment will be described in the next section.

One example will be specifically described below on how to determine {eui, evi} when a normal vector $\pi i = (l_i, m_i, n_i)$ to a CCD plane is given. As constraint conditions, the following is set:

{eui, evi} is orthogonal; and
eui has no y-component (the direction of u is horizontal to the ground). The orthogonality condition is a tacit condition for every discussion in the following description. From the above-described conditions, the condition equations are obtained as follows:

$$\pi_i \cdot e_{ui} = 0 \quad (3)$$

$$\pi_i \cdot e_{vi} = 0 \quad (4)$$

$$e_{ui} \cdot e_{vi} = 0 \quad (5)$$

By solving these equations, the (non-unit) basis vectors are given as follows:

$$e_{ui} = \begin{pmatrix} n_i \\ 0 \\ -l_i \end{pmatrix} \quad (6)$$

$$e_{vi} = \begin{pmatrix} -l_i \cdot m_i \\ l_i^2 + n_i^2 \\ -m_i \cdot n_i \end{pmatrix} \quad (7)$$

When dropping the condition: "the direction of u is horizontal to the ground," each basis vector is assumed to be rotated by α degrees around the optical axis, so that each basis vector is given as follows:

$$e_{ui} = \begin{pmatrix} n_i \cdot \cos(\alpha) + l_i \cdot m_i \cdot \sin(\alpha) \\ -(l_i^2 + n_i^2) \cdot \sin(\alpha) \\ -l_i \cdot \cos(\alpha) + m_i \cdot n_i \cdot \sin(\alpha) \end{pmatrix} \quad (8)$$

$$e_{vi} = \begin{pmatrix} -l_i \cdot m_i \cdot \cos(\alpha) + n_i \cdot \sin(\alpha) \\ (l_i^2 + n_i^2) \cdot \cos(\alpha) \\ -m_i \cdot n_i \cdot \cos(\alpha) - l_i \cdot \sin(\alpha) \end{pmatrix} \quad (9)$$

In this case, eui clearly has a y-component. In addition, y=const. When designating a plane, eui=0 (indefinite) according to the above equations. Consequently, it is suitably determined within an xy plane separately. When these basis vectors are normalized, its dimension is better adjusted to the world coordinate system so that there will be no confusion in the subsequent processing.

Figure 7A:
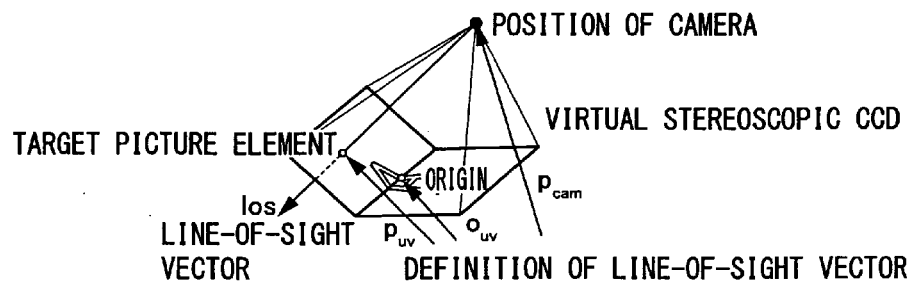
FIG. 7A is a view illustrating a definition of a line-of-sight vector in a relationship between the virtual screen and a line-of-sight vector.
Figure 7B:
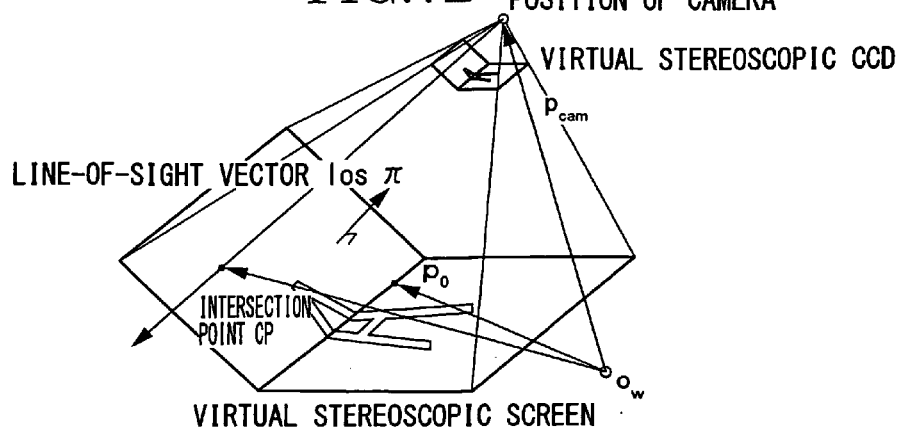
FIG. 7B is a view illustrating a definition of the virtual screen, and the position of an intersection, in a relationship between the virtual screen and the line-of-sight vector.

3.3 Determination of a Line-of-Sight Vector, and Corresponding Point on a Screen When the representations of the uv vectors are determined for a picture element, a line-of-sight vector from the position of the camera is determined as illustrated in FIG. 7A, and a point at which this line-of-sight vector points is determined on the stereoscopic screen. To seek this point is an operation in which an intersection of a straight line and a plane is sought; and it is not so difficult to work with, but its formulation varies depending on a representation approach. One example using a vector representation is described below. Referring to FIG. 7B, equations to be solved are the following two equations:

$$\pi \cdot (CP - P_0) = 0 \quad (10)$$

$$P_{cam} + t \cdot los = CP \quad (11)$$

By solving the above equations, the intersection is given by the following equation:

$$CP = P_{cam} - \left( \frac{\pi \cdot (P_{cam} - P_0)}{n \cdot los} \right) los \quad (12)$$

3.4 How to Give Stereoscopic CCD and Stereoscopic Screen

Figure 8:
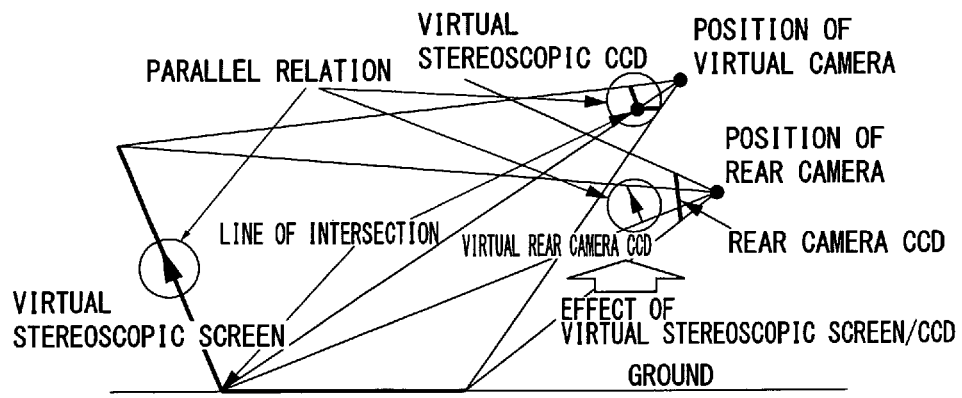
FIG. 8 is an entire view illustrating a relationship between the virtual screen and the line-of-sight vector.

As illustrated in FIGS. 4B and 4C, how an image is displayed on a monitor varies depending on the shape of the virtual stereoscopic CCD. Although which representation is selected depends on the situation, a setting example of FIG. 4C is illustrated in FIG. 8. In FIG. 8, the stereoscopic CCD and the stereoscopic screen are set in parallel to each other. At this time, what the problems are that how an image is displayed on the stereoscopic screen, and what changes when an angle is changed.

The answer is that an image is displayed as if it is shot by the "virtual" rear camera CCD. The virtual rear camera CCD has the following features:

it is at the same position as that of the rear camera; and
it is parallel to the stereoscopic screen.

As a result, the same image as that at the time when the elevation angle of the rear camera is changed is obtained. Accordingly, an image generated by the stereoscopic CCD of FIG. 8 has the following features:

the distant image is displayed as a camera image at a designated angle;
the close view is displayed as the downward image; and
the downward image and the distant image are continuously connected.

However, as illustrated in FIG. 8, to achieve these effects, two lines of intersection of stereoscopic planes and the position of the virtual camera needs to be aligned with each other when viewed from the side. That is, the following three parameters cannot be independently set:

the position of the virtual camera;
the position/shape of the stereoscopic CCD; and
the position/shape of the stereoscopic screen.

When two of them are determined, the other one is automatically determined.

3.5 Projection from Stereoscopic Screen onto Stereoscopic CCD

Figure 9:
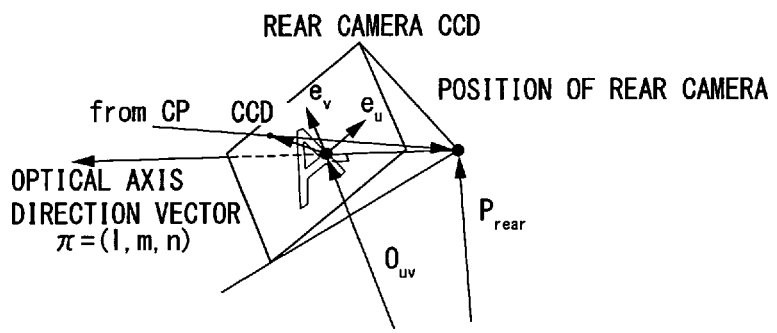
FIG. 9 is a view illustrating various definitions around a rear camera CCD.

One point on the stereoscopic screen is designated according to the Equation (12). The next problem is to seek a corresponding point on the rear camera CCD as illustrated in FIG. 9, and, more specifically, to seek an intersection formed by a straight line (a line-of-sight) and a CCD plane. Eventually, this problem is to seek an intersection of a plane and a straight line, and is the same in principle as that in Sec. 3.2 except that the CCD and the screen are interchanged. However, the difference exits in that a representation to be eventually sought is not in the form of three dimensional position vector, but in the form of (u, v) coordinate system on the CCD surface. Accordingly, as illustrated in FIG. 9, the CCD surface is represented using $\{e_u, e_v\}$. The expression is the same as that used in Sec. 3.1, but this is defined hereinafter on the surface of the rear camera CCD.

Although there are several methods on determination of the basis vectors on the rear camera CCD, adjustable procedures are desired since adjusting them into the real rear camera is necessary. Hereinafter, two methods will be described. However, it is assumed that optical effects such as distortion of lens are completely eliminated, and the rear camera is handled as a pinhole camera.

3.5.1 Determination of Rear Camera $\{e_u, e_v\}$

First, on determination of $\{e_u, e_v\}$, a method for designating a line-of-sight of a camera, and another method for designating with a rotation matrix, which has been performed, will be described.

3.5.1.1 Determination by Designating a Line-Of-Sight

Parameters to be used in this method are two as follows:

a vector in the direction of the optical axis of a camera (i.e., normal vector of a CCD $\pi = (l, m, n)$); and
rotation angle $\alpha$ around the optical axis of a camera.

The "vector in the direction of the optical axis of a camera" is a directional vector of a line-of-sight at which a camera points, and also a normal vector of a CCD. With this value and a camera position and a focal length, a CCD plane can be fixed in the world coordinate system. At this time, since a remaining degree of flexibility is the rotation of the optical axis, when a rotation angle from the horizontal direction is denoted by $\alpha$, the basis vectors, which are the same as those of Sec. 3.1, are represented as follows:

$$e_u = \begin{pmatrix} n \cdot \cos(\alpha) + l \cdot m \cdot \sin(\alpha) \\ -(l^2 + n^2) \cdot \sin(\alpha) \\ -l \cdot \cos(\alpha) + m \cdot n \cdot \sin(\alpha) \end{pmatrix} \quad (13)$$

$$e_v = \begin{pmatrix} -l \cdot m \cdot \cos(\alpha) + n \cdot \sin(\alpha) \\ (l^2 + n^2) \cdot \cos(\alpha) \\ -m \cdot n \cdot \cos(\alpha) - l \cdot \sin(\alpha) \end{pmatrix} \quad (14)$$

At this time, the origin of $\{e_u, e_v\}$ is an intersection of the position of the optical axis and the CCD plane. Incidentally, the reason why the focal length is not explicitly included in the above equations is that $\{e_u, e_v\}$ is not normalized. For example, since the size of a picture element is determined using a picture element angle and a focal length, $\{e_u, e_v\}$ is normalized to its size so that (u, v) values can be represented as picture element values as it is.

3.5.1.2 Determination by Rotation Matrix

Figure 10A:
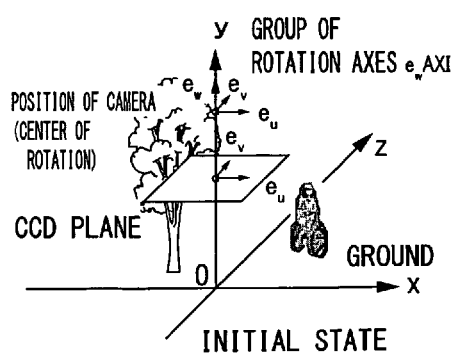
FIG. 10A is a view illustrating definitions of symbols around the rear camera in an initial state.
Figure 10B:
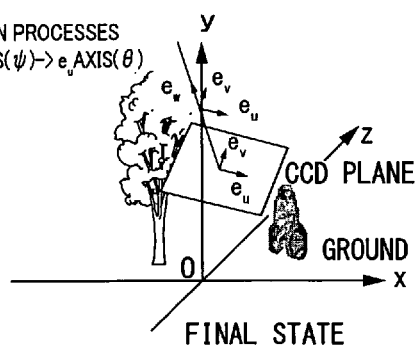
FIG. 10B is a view illustrating definitions of symbols around the rear camera in a final state.

As a method having been already implemented, there is a method in which, for a camera pointing directly downward as illustrated in FIG. 10, rotation processes are performed in the procedure from an ew axis to an ev axis to an eu axis, so that a camera position is designated. Here, the eu axis is a horizontal axis on the screen, and the ev axis is a vertical axis. The origin of these axes corresponds to the center (optical axis) of the screen. Using their rotation angles, the final $\{e_u, e_v\}$ are obtained, and these are useful from a viewpoint of the continuity of a conventional method. The process of its calculation is somewhat complicated, and hence only a result thereof is described as follows:

$$e_u = \begin{pmatrix} \cos(\phi)\cos(\psi) \\ -\sin(\psi) \\ \cos(\psi)\sin(\phi) \end{pmatrix} \quad (15)$$

$$e_v = \begin{pmatrix} \cos(\theta - \phi - \psi) + \cos(\theta + \phi - \psi) - \sin(\theta - \phi) - \\ \frac{\cos(\theta - \phi + \psi) + \cos(\theta + \phi + \psi)}{4} + \frac{\sin(\theta + \phi)}{2} \\ \cos(\psi)\sin(\theta) \\ \frac{\cos(\theta - \phi) + \cos(\theta + \phi)}{2} + \sin(\theta)\sin(\phi)\sin(\psi) \end{pmatrix} \quad (16)$$

where correspondences between rotation axes and angles are as follows:

$\phi$: rotation of ew axis (a first rotation);
$\varphi$: rotation of ev axis (a second rotation); and
$\theta$: rotation of eu axis (a third rotation).

3.5.2 Projection Onto Rear Camera CCD

Using $\{e_u, e_v\}$ determined using the above result, the CCD vector of FIG. 9 can be expressed as follows:

$$CCD = u \cdot e_u + v \cdot e_v \quad (17)$$

At this time, obtaining (u, v) values is desired, the values being corresponding to the intersection CP (refer to FIG. 7B) obtained in Sec. 3.2. The (u, v) values are obtained by solving the above equation together with the equation (18) below.

$$CCD = t \cdot (P_{rear} - CP) + P_{rear} - O_{uv} \quad (18)$$

Incidentally, $O_{uv}$ is a position vector in three dimensions that represents the origin on the CCD plane in the world coordinate system. Only a result is described as follows:

$$CCD = \frac{(O_{uv} - P_{rear}) \cdot (e_u \times e_v)}{(P_{rear} - CP) \cdot (e_u \times e_v)} (P_{rear} - CP) + P_{rear} - O_{uv} \quad (19)$$

$$u = e_u \cdot CCD \quad (20)$$

$$v = e_v \cdot CCD \quad (21)$$

Wherein, Prear represents the position of the rear camera, and an operator × represents the cross product of three-dimensional vectors. Since correspondences between the (u, v) values and an actual camera image depend on image coordinates of a camera system, they cannot be described in general. Accordingly, in the next chapter, an example of transformation in the case where a specific machine is used will be described.

3.6 Summary of Stereoscopic Screen

This chapter presents the principle and its basic equations of the viewpoint transformation using a stereoscopic screen, along the flow of the processes of the viewpoint transformation. The present technique enables "simultaneous displays of the downward image and the image on the horizon," which is not possible with the conventional technique. Accordingly, the flexibility of representation has been increased. However, instead of the increased flexibility of representation, further understanding is required for generating downward data.

In addition, calculation time is also possibly increased. As a technical point of view, by simplifying the implementation as much as possible, fast calculation is possibly enabled. However, due to a fundamental difference between a conventional method and the present method, an amount of calculation processes is drastically increased. The fundamental difference is, i.e., difference between batch processing for all picture elements, and separate processing for each picture element. Consequently, it becomes even more difficult for a microcomputer to operate in performing processes. As a result, an application of the method to self-calibration by a microcomputer may become even harder.

4. Real Camera Image and Correspondence

Figure 11:
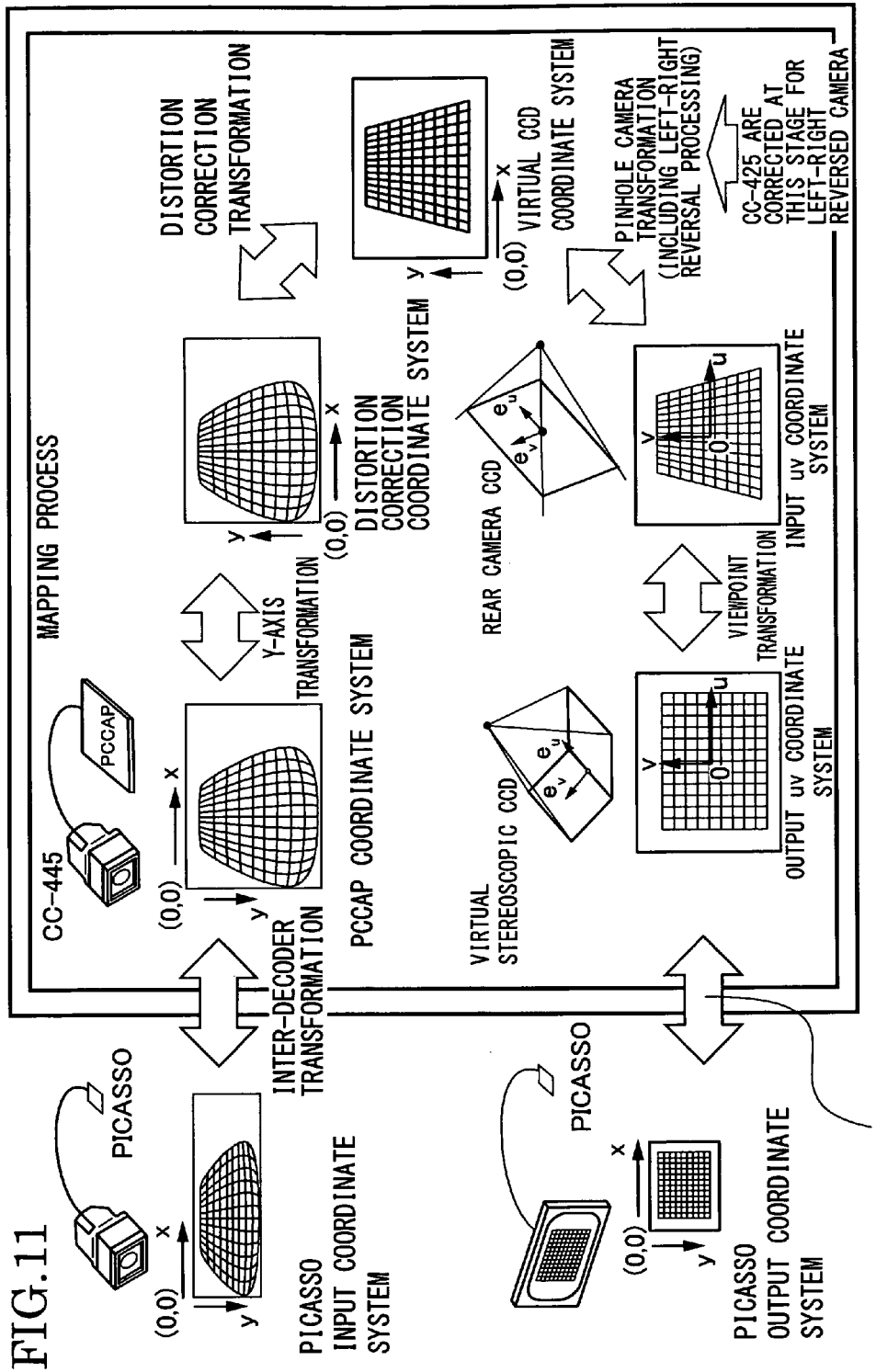
FIG. 11 is a view illustrating interactions in various coordinate transformations.

FIG. 11 illustrates a whole picture of a mutual transformation process to be described in this chapter. A series of processes here also includes a distortion correction process so as to adapt the transformation process of the preceding section assuming the use of the pinhole camera to characteristics of a wide angle camera. More specifically, six transformations illustrated by arrows of FIG. 11, i.e., inter-decoder transformation;
y-axis transformation;
distortion correction transformation;
pinhole camera transformation;
viewpoint transformation; and
encoder transformation, are performed in procedure to calculate corresponding points. In the preceding section, only the "viewpoint transformation" has been described. Accordingly, the transformation processes other than viewpoint transformation will be described in this chapter. Incidentally, in this description, an embodiment using the following, camera: CC-445 (manufactured by Clarion Co., Ltd.)
decoder: PCCAP (manufactured by I-O DATA DEVICE INC.) will be described below.

4.1 Inter-Decoder Transformation

This transformation interchanges decoder performance of a video capture card PCCAP (manufactured by I-O DATA DEVICE INC.) and decoder performance of PICASSO. PCCAP is hardware which is used when a distortion correction technology is developed, and a correction coefficient has been determined in this coordinate system so that it needs to be used in the foreseeable future. A simplest transformation is to multiply a length and a width by a ratio of resolution, so that coordinate values are caused to correspond. However, this correspondence is an approximate one, so discrepancies definitely occur.

Image cut-out regions cut out from an NTSC signal are different between the PCCAP decoder and the PICASSO decoder. From an empirical point of view, out of positions on the order of a few percentages commonly exist. When all data are prepared, the following processes may be considered:

compare decoder performances and determine which one to be used; and
capture the same camera image using the decoders, and compare the captured images.

However, the above processes cannot be performed unfortunately since:

no performance data are available for both decoders, PCCAP and PICASSO; and
digital image data of PICASSO cannot be taken out.

Although a measure to be taken uses complex procedures, a method is under development in which simultaneous equations are solved with respect to three mutual transformations along with encoder performance of a PICASSO power range system. At this time, so that internal coordinate system can be measured from outside, a superimpose function of PICASSO is used concomitantly. A presently proven transformation equation is only a result that has been adjusted using an evaluation board (an external decoder) under the development of PICASSO.

4.2 y-Axis Transformation

This is a transformation in which an origin is set above or below. A coordinate system is used in which an origin is set below when the distortion correction technology is developed. A transformation is performed simply with the number of picture elements in the y-axis.

4.3 Distortion Correction Transformation

A present distortion correction technology processes bit-map images (resolution 640×480) before and after performing distortion correction in a non-dimensional picture element space, the bit-map images being captured by PCCAP (manufactured by I-O DATA DEVICE INC.). As illustrated in FIG. 12B, in the principle of this transformation process, a distance from the position of the optical axis of each picture element is only changed. As illustrated in a graph of FIG. 12A, an amount of transformation is represented by a monotone increasing function of high order, and experimentally determined in advance. From an empirical point of view, on Clarion manufactured cameras, the positions of optical axes fluctuate on the order of a few percentages even in the same lot. When the amount of fluctuation is not small, an image process to be performed along a peripheral part of an image on which a rate of distortion is high is influenced. Consequently, a peripheral part had better not be transformed.

4.4 Pinhole Camera Transformation

The distortion correction image transformation is the non-dimensional process, and introduces a physical quantity so that a captured image is caused to correspond to an image on the virtual CCD plane in the world coordinate system. FIGS. 13A and 13B are views illustrating a concept at that time. Images before and after performing the distortion correction in the drawing have the same resolution 640×480 as that of the preceding section, but corresponding camera models are different as seen from schematic views of FIGS. 13A and 13B.

In the schematic view of a wide angle camera illustrated in FIG. 13A, the position of the optical axis is not at the center of an image. There has been no case where the position of the optical axis is at the center, according to experiments conducted up to now using our company's camera. The "position of the camera" on the optical axis in the drawing represents a focal length from the CCD plane, and also corresponds to the position of a lens. This drawing depicts a state in which oblique incident light refracts on the position of the camera (lens) and forms an image on the CCD plane, and as a result, a distorted image is formed.

Meanwhile, the schematic view of a pinhole camera illustrated in FIG. 13B is different. Compared with the schematic view of the wide angle camera, a physical size of the CCD is drawn somewhat larger, and the focal length is shorter. In addition, incident light is drawn so that an image does not refract, and linearly forms an image on the CCD plane. From this schematic view, it is understood that, for example, even when setting the size (or pixel size) of the CCD plane to be larger, if the focal length is set longer in the same proportion, the same image of the same resolution can be obtained. That is, the scale setting of the pinhole camera is free to be made so long as the same ratio is retained unless some special event occurs. From this schematic view, camera constants necessary for calculating corresponding points are as follows:

the position of the optical axis on the virtual CCD plane;
focal length f on the virtual CCD; and
pixel size (Wx, Wy) of the virtual CCD.

For the sake of simplicity, the position of the optical axis is set at the center (319.5, 239.5) of the image in the drawing. However, the pinhole camera is a virtual one, and hence it is free to set the center at any place. On the latter two items, an absolute value itself is not very important as previously described.

Using these setting values of the virtual CCD, and considering a relationship illustrated in FIG. 14, transformation processing into the world coordinate system is performed using the following equation:

$$\begin{pmatrix} u \\ v \end{pmatrix} = (W_x \quad W_y) \left[ \begin{pmatrix} x \\ y \end{pmatrix} - O_c \right] \quad (22)$$

where (Wx, Wy) denote pixel sizes of the virtual CCD (Wx=Wy, in general); and Oc denotes the optical center of the virtual CCD (arbitrary, but at the center of an image in general). Incidentally, as described in Sec. 3.2, the basis vectors {eu, ev} are generally normalized to those with unit lengths in the world coordinate system. In that case, (Wx, Wy) has a meaning as the pixel sizes of the virtual CCD. Unless the basis vectors are not normalized in the world coordinate system, these values do not represent pixel sizes, but represent proportional coefficients.

Further, for an in-vehicle rear camera, a left-right reversal process of:

$$-u \Rightarrow u \quad (23)$$

is frequently necessary. In general, a rear camera image is outputted as a left-right reversed image, and the same is true for CC-445.

4.5 Viewpoint Transformation

Since this viewpoint transformation has been described in Chap. 3, a further description thereof is omitted.

4.6 Encoder Transformation

This encoder transformation is related to design of an outputted image, and thus a general equation cannot be presented. However, for the case where displaying is simply performed on the center of an image at, for example, a constant scale, the following equation is given, $$\begin{pmatrix} x \\ y \end{pmatrix} = \alpha \cdot \begin{pmatrix} u \\ -v \end{pmatrix} + SC \quad (24)$$

where α denotes a scale constant, and SC denotes the center of an outputted image (in FIG. 11, SC=(179.5, 119.5)). It should be noted here that when a rear camera image is outputted, a left-right reversal is sometimes requested for a driver's viewpoint. In that case, a left-right reversal process is performed as pointed out in Sec. 4.4. At that time, before the above process, the following process is performed, $$u \Rightarrow -u \quad (25)$$

or after the process, a left-right reversal process needs to be performed. In the case of the latter process, attention needs to be paid when the optical axis, which is left-right asymmetric, is set and a picture is generated.

Incidentally, depending on the combination of encoder performance and monitor performance, a center point of an encoder coordinate system is not necessarily a center point on an output monitor, so that, in many cases, it is adjusted using SC in the above equation.

5. Conclusions

In this description, the following has been described:
the concepts of the stereoscopic screen/stereoscopic CCD;
the principle of the viewpoint transformation technique using the two-plane models
the whole image of a group of coordinate transformations; and the concept and technique of each transformation process.

In this description, all transformation equations are presented, and a mapping table should be able to be generated if the described procedure is followed.

Subsequently, "setting of the tilt angles α, β of the two-plane model" will be described.

The tilt angle α is an angle formed by the close view screen 71 and the distant view screen 72 of the virtual stereoscopic projection plane 7 (which is the virtual stereoscopic screen). The tilt angle β is an angle formed by the close view imaging plane 91 and the distant view imaging plane 92 of the virtual stereoscopic imaging plane 9 (which is the virtual stereoscopic CCD).

Figure 15:
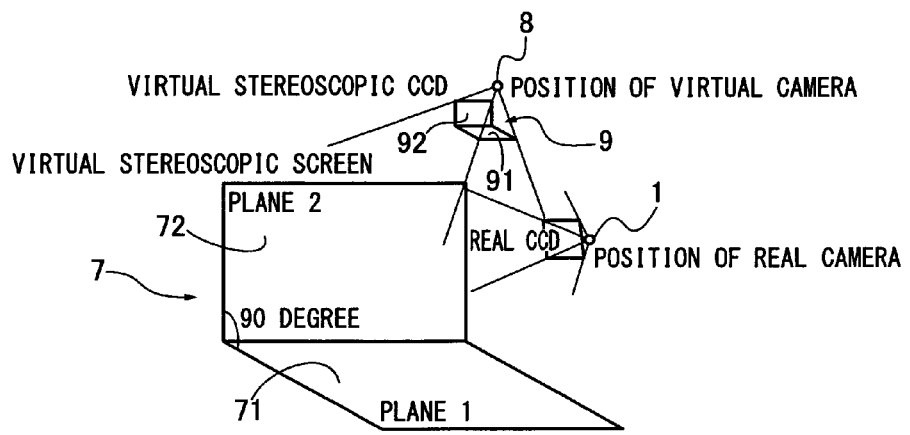
FIG. 15 is a schematic view illustrating an example of preferable shapes of the virtual stereoscopic screen and the virtual stereoscopic CCD in the image generating apparatus of Embodiment 1.

In the image generating apparatus of the Embodiment 1 of FIG. 15, as preferable shapes of the virtual stereoscopic screen 7 and the virtual stereoscopic CCD 9, an example in which the tilt angle α=the tilt angle β=90 degrees is illustrated by a schematic view.

Figure 16A:
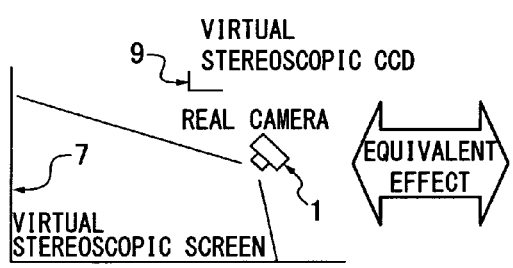
FIG. 16A is a view illustrating an example of setting of one camera to a 90-degree virtual stereoscopic screen and a 90-degree virtual stereoscopic CCD.

FIG. 16A is a view which the schematic view thereof is viewed from the side, and which illustrates a state in which, for the 90-degree-virtual stereoscopic screen 7 and the 90-degree-virtual stereoscopic CCD 9, the single rear camera 1 is set. At this time, a schematic view which is equivalent to the obtaining of monitor image data to be generated by the image processing controller 2 is illustrated by FIG. 16B.

Figure 16B:
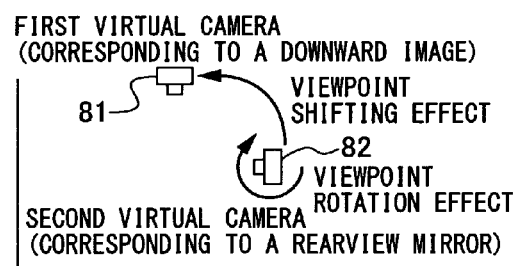
FIG. 16B is a view illustrating an example in which one real camera to the 90-degree virtual stereoscopic screen and the 90-degree virtual stereoscopic CCD, is replaced by two virtual cameras (a viewpoint-shifted first virtual camera, and a viewpoint-rotated second virtual camera).

More precisely, a viewpoint transformation technique using the virtual camera 8, the 90-degree-virtual stereoscopic screen 7, and the 90-degree-virtual stereoscopic CCD 9 can be replaced by, as illustrated in FIG. 16B, a viewpoint transformation being viewed from a first virtual camera 81 and a second virtual camera 82. The first virtual camera is a virtual camera which the viewpoint thereof is shifted so that the virtual camera is placed at a higher position than that of the rear camera 1 and that the virtual camera points at the ground.

The second virtual camera is a virtual camera which the viewpoint thereof is rotated so that the virtual camera points more upward or downward direction than does the rear camera 1.

Further, on a plane 1 by the close view screen 71, the downward image viewed from directly above is generated, and on a plane 2 by the distant view screen 72, an image seen when viewing backward horizontally is generated as in a rearview mirror.

Figure 17:
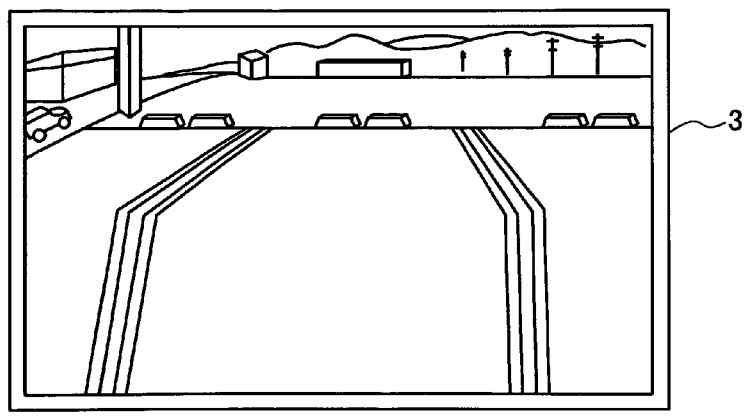
FIG. 17 is a view illustrating an example of a monitor image using the 90-degree virtual stereoscopic screen and the 90-degree virtual stereoscopic CCD.

FIG. 17 is a view illustrating an example of a monitor image using the 90-degree-virtual stereoscopic screen and the 90-degree-virtual stereoscopic CCD. An image processing technique of the invention is capable of handling not only stereoscopic screens of 90 degrees but also those of any degree in principle; however, a stereoscopic screen of 90 degrees is best to be used for an image seen when viewing directly backward as in a rearview mirror. Incidentally, the inventor has tried to change ±10 degrees from 90 degrees. In this case, a small perspective has been given to an image corresponding to the plane 2 of the distant view screen 72. Accordingly, this small perspective is considered as a threshold value at which a person start feeling discomfort, so that the tilt angles $\alpha$, $\beta$ are each set to be in an angular range of 80 degrees to 100 degrees as suitable angles in a two-plane model.

Next, effects will be described.

Effects described below can be obtained for the image generating apparatus and the image generating method of the Embodiment 1.

(1) A rear camera 1 which captures camera image data projected onto a single real imaging plane and ranging from a close view to a distant view; an image processing controller 2 which sets a first virtual camera in which a viewpoint thereof is shifted so as to be located higher than a viewpoint of the rear camera 1 and to face ground, and sets a second virtual camera in which a viewpoint thereof is rotated from the viewpoint of the rear camera 1 so as to face upward or downward, and which generates, from the single camera image data captured by the rear camera 1, monitor image data for the close view viewed from the first virtual camera and monitor image data for an intermediate view to the distant view viewed from the second virtual camera; and a monitor 3 which displays a synthesis image in which a downward image of the close view projected by the monitor image data for the close view generated by the image processing controller 2 and a perspective image of the intermediate view to the distant view projected by the monitor image data for the intermediate view to the distant view generated by the image processing controller 2 are synthesized, are included. Therefore, it is possible to provide the image generating apparatus which generates the monitor image data where the downward display for the close view and the perspective display for the intermediate-to-distant view are seamlessly joined, while simplifying calculation processes.

(2) A mapping table is generated by performing a coordinate transformation of a position of each picture element in an order of: designating one position of the picture element on a virtual imaging plane of the virtual camera 8; determining a first corresponding position on a virtual projection plane, corresponding to the designated one position of the picture element; and determining a second corresponding position on the imaging plane of the rear camera 1, corresponding to the first corresponding position, and the image processing controller 2 performs a coordinate transformation, by using the mapping table, between the position of the each picture element of the single camera image data captured by the rear camera 1 and the position of the each picture element on the virtual imaging plane of the virtual camera 8. Therefore, it is possible to display an image on the monitor 3 at high speed by means of a map search instead of performing calculation processes for coordinate transformation involving a large amount of calculation, and also possible to find corresponding points for all picture elements on the virtual imaging plane, which become an output image to the monitor 3.

For example, when the position of one single picture element on the imaging plane of the real camera is designated, and corresponding points on the virtual stereoscopic imaging plane 9 are eventually designated, corresponding points for all the picture elements cannot be obtained in some cases since expansion/contraction occurs due to a transformation into a downward image. Meanwhile, by designating, in advance, the position of one picture element on the virtual imaging plane of the virtual camera 8, the corresponding points for all the picture elements on the virtual stereoscopic imaging plane 9, which become an output image to the monitor 3, can be obtained.

(3) A transformation relationship characteristic indicating a relationship between a distance of a picture element from an optical axis by a distorted image of the camera image data and a distance of a picture element from an optical axis by a non-distorted image of the camera image data is determined in advance, and the image processing controller 2 corrects a distortion of a coordinate system of the position of the each picture element of the single camera image data captured by the rear camera 1, by using the distance of the each picture element from the optical axis and the transformation relationship characteristic, to transform it into a coordinate system of the virtual imaging plane. Therefore, by performing a simple correction transformation using the amount-of-transformation relationship characteristic, a distortion of an image caused by a camera lens is corrected, and the perspective image of the distant view being linearly drawn can be obtained as in an image screen of a pinhole camera.

(4) The image processing controller 2 is connected with a virtual camera position adjustment operation knob 4 which sets the virtual camera 8 on an arbitrary spatial position in accordance with an external operation. Therefore, a balance between the downward image of the close view to be displayed on the lower part of a monitor screen and the perspective image of the distant view to be displayed on an upper part thereof is suitably adjusted.

(5) The image processing controller 2 is connected with a screen angle adjustment operation knob 5 which arbitrarily sets an upward tilt angle $\alpha$ of a screen for the distant view 72 to a screen for the close view 71 in accordance with an external operation. Therefore, the flexibility of a design on the monitor screen can be increased, thus allowing the perspective image of the distant view to have a design which causes a perspective to be markedly displayed, a design which gives a strong stereoscopic effect, and the like.

(6) The image processing controller 2 is connected with an imaging plane angle adjustment operation knob 6 which arbitrarily sets a downward tilt angle $\beta$ of an imaging plane for the distant view 92 to an imaging plane for the close view 91 in accordance with an external operation. Therefore, the flexibility of a design on a monitor screen can be increased, thus allowing a perspective image of the distant view to have a design which causes a perspective to be markedly displayed, a design which gives a strong stereoscopic effect, and the like.

(7) The real camera is a rear camera 1 attached to a rear part of a vehicle and which images a view behind the vehicle. Therefore, an synthesis image produced from the downward image for the close view to be displayed on a lower part, and the perspective image for the intermediate-to-distant view is displayed on a monitor whereby circumstances around a rear part of the vehicle including a sense of distance and a perspective will be shown, thus assisting driving.

(8) A rear camera 1 which captures camera image data projected onto a single real imaging plane and ranging from a close view to a distant view; an image processing controller 2 which sets a virtual camera 8 at a position higher than the rear camera 1, which sets a virtual stereoscopic projection plane 7, as a virtual projection plane from the virtual camera 8, including a close view screen 71 set on ground and a distant view screen 72 being connected to a side of the close view screen 71 far from the rear camera 1 and set to have a predetermined upward tilt angle $\alpha$, which performs a coordinate transformation between a position of each picture element of the single camera image data captured by the rear camera and a position of each picture element on a virtual imaging plane of the virtual camera 8 through the virtual stereoscopic projection plane 7, which transfers the each picture element of the camera image data onto the virtual imaging plane of the virtual camera 8 according to the coordinate transformation, and which generates monitor image data for obtaining a monitor image, the monitor image being as an image to be projected on the virtual imaging plane when the virtual stereoscopic projection plane 7 is viewed from the virtual camera 8; and a monitor 3 which displays a synthesis image in which a downward image of the close view and a perspective image of an intermediate view to the distant view projected by the monitor image data generated by the image processing controller 2 are synthesized, are included. Therefore, it is possible to provide the image generating apparatus which generates the monitor image data in which the downward display for the close view and the perspective display from the intermediate-to-distant view are seamlessly joined, while simplifying calculation processes and obtaining a high flexibility on a viewpoint transformation by setting the virtual camera 8 and the virtual stereoscopic projection plane 7.

(9) A rear camera 1 which captures camera image data projected onto a single real imaging plane and ranging from a close view to a distant view; an image processing controller 2 which sets a virtual camera 8 at a position higher than the rear camera 1, which sets a virtual stereoscopic projection plane 7, as a virtual projection plane from the virtual camera 8, including a close view screen 71 set on ground and a distant view screen 72 being connected to a side of the close view screen 71 far from the rear camera 1 and set to have a predetermined upward tilt angle $\alpha$, which sets a virtual stereoscopic imaging plane 9, as a virtual imaging plane of the virtual camera 8, including a close view imaging plane 91 parallel to the close view screen 71 and a distant view imaging plane 92 connected to a side of the close view imaging plane 91 near from the rear camera 1 and set to have a predetermined downward tilt angle $\beta$, which performs a coordinate transformation between a position of each picture element of the single camera image data captured by the rear camera 1 and a position of each picture element on the virtual imaging plane of the virtual camera 8 through the virtual stereoscopic projection plane 7, which transfers the each picture element of the camera image data onto the virtual stereoscopic imaging plane 9 of the virtual camera 8 according to the coordinate transformation, and which generates monitor image data for obtaining a monitor image, the monitor image being as an image to be projected on the virtual stereoscopic imaging plane 9 when the virtual stereoscopic projection plane 7 is viewed from the virtual camera 8; and a monitor 3 which displays a synthesis image in which a downward image of the close view and a perspective image of an intermediate view to the distant view projected by the monitor image data generated by the image processing controller 2 are synthesized, are included. Therefore, it is possible to provide the image generating apparatus which generates the monitor image data in which the downward display for the close view and the perspective display from the intermediate-to-distant view are seamlessly joined, while simplifying calculation processes, eliminating a perspective occurring on the virtual stereoscopic projection plane 7, and obtaining an extremely high flexibility on the viewpoint transformation by setting the virtual camera 8, the virtual stereoscopic projection plane 7, and the virtual stereoscopic imaging plane 9.

(10) Capturing camera image data projected onto a single real imaging plane of a rear camera 1 and ranging from a close view to a distant view; setting a virtual camera 8 at a position higher than the rear camera 1; setting a virtual stereoscopic projection plane 7, as a virtual projection plane, including a close view screen 71 set on ground and a distant view screen 72 being connected to a side of the close view screen 71 far from the rear camera 1 and set to have a predetermined upward tilt angle $\alpha$; performing a coordinate transformation between a position of each picture element of the single camera image data captured by the rear camera and a position of each picture element on a virtual imaging plane of the virtual camera 8 through the virtual stereoscopic projection plane 7; generating monitor image data for obtaining a monitor image, the monitor image being as an image to be projected on the virtual imaging plane when the virtual stereoscopic projection plane 7 is viewed from the virtual camera 8, by transferring the each picture element of the camera image data onto the virtual imaging plane of the virtual camera 8 according to the coordinate transformation; and displaying on a monitor a synthesis image in which a downward image of the close view and a perspective image of an intermediate view to the distant view projected by the generated monitor image data are synthesized, are included. Therefore, it is possible to provide the image generating method which generates the monitor image data in which the downward display for the close view and the perspective display from the intermediate-to-distant view are seamlessly joined, while simplifying calculation processes, and obtaining a high flexibility on the viewpoint transformation by setting the virtual camera 8 and the virtual stereoscopic projection plane 7.

(11) A mapping table is generated by performing a coordinate transformation of a position of each picture element in an order of: designating one position of the picture element on a virtual imaging plane of the virtual camera 8; determining a first corresponding position on a virtual projection plane, corresponding to the designated one position of the picture element; and determining a second corresponding position on the imaging plane of the rear camera 1, corresponding to the first corresponding position, and a coordinate transformation, by using the mapping table, between the position of the each picture element of the single camera image data captured by the rear camera 1 and the position of the each picture element on the virtual imaging plane of the virtual camera 8 is performed. Therefore, the displaying of an image on the monitor 3 is enabled at high speed by means of a map search instead of performing calculation processes for the coordinate transformation involving a large amount of calculation, and the seeking of corresponding points for all picture elements on a virtual imaging plane, which will become an output image to the monitor 3, is also enabled.

For example, when the position of a single picture element on the imaging plane of the real camera is designated, and corresponding points on the virtual stereoscopic imaging plane 9 are eventually determined, corresponding points for all the picture elements cannot be obtained in some cases since expansion/contraction occurs due to a transformation into the downward image. Meanwhile, by designating in advance the position of a single picture element on the virtual imaging plane of the virtual camera 8, corresponding points for all the picture elements on the virtual stereoscopic imaging plane 9, which will become an output image to the monitor 3, can be obtained.

(12) A transformation relationship characteristic indicating a relationship between a distance of a picture element from an optical axis by a distorted image of the camera image data and a distance of a picture element from an optical axis by a non-distorted image of the camera image data is determined in advance, and a distortion of a coordinate system of the position of the each picture element of the single camera image data captured by the rear camera 1 is corrected, by using the distance of the each picture element from the optical axis and the transformation relationship characteristic, to transform it into a coordinate system of the virtual imaging plane. Therefore, by performing the simple correction transformation using the amount-of-transformation relationship characteristic, a distortion of an image caused by a camera lens is corrected, and the perspective image of the distant view being linearly drawn can be obtained as in an image screen of a pinhole camera.

(13) The virtual camera 8 is set on an arbitrary spatial position in accordance with an external operation to a virtual camera position adjustment operation knob 4. Therefore, a balance between the downward image of the close view to be displayed on a lower part of a monitor screen, and the perspective image of the distant view to be displayed on an upper part thereof is suitably adjusted.

(14) An upward tilt angle $\alpha$ of a screen for the distant view 72 to a screen for the close view 71 is set in accordance with an external operation to a screen angle adjustment operation knob 5. Therefore, the flexibility of a design on the monitor screen can be increased, thus allowing the perspective image of the distant view to have a design which causes a perspective to be markedly displayed, a design which gives a strong stereoscopic effect, and the like.

(15) A downward tilt angle $\beta$ of an imaging plane for the distant view 92 to an imaging plane for the close view 91 is set in accordance with an external operation to an imaging plane angle adjustment operation knob 6. Therefore, the flexibility of a design on the monitor screen can be increased, thus allowing the perspective image of the distant view to have a design which causes a perspective to be markedly displayed, a design which gives a strong stereoscopic effect, and the like.

(16) The camera image data is captured by the rear camera 1 attached to a rear part of a vehicle and which images a view behind the vehicle. Therefore, the synthesis image produced from the downward image of the close view to be displayed on a lower part, and the perspective image of the intermediate-to-distant view is displayed on the monitor, whereby circumstances around a rear part of the vehicle including a sense of distance and a perspective will be shown, thus assisting driving.

(17) Capturing camera image data projected onto a single real imaging plane of a rear camera 1 and ranging from a close view to a distant view; setting a virtual camera 8 at a position higher than the rear camera 1; setting a virtual stereoscopic projection plane 7, as a virtual projection plane from the virtual camera 8, including a close view screen 71 set on ground and a distant view screen 72 being connected to a side of the close view screen 71 far from the rear camera 1 and set to have a predetermined upward tilt angle $\alpha$; setting a virtual stereoscopic imaging plane 9, as a virtual imaging plane of the virtual camera 8, including a close view imaging plane 91 parallel to the close view screen 71 and a distant view imaging plane 92 connected to a side of the close view imaging plane 91 near from the rear camera 1 and set to have a predetermined downward tilt angle $\beta$; performing a coordinate transformation between a position of each picture element of the single camera image data captured by the rear camera 1 and a position of each picture element on the virtual stereoscopic imaging plane 9 of the virtual camera 8 through the virtual stereoscopic projection plane 7; generating monitor image data for obtaining a monitor image, the monitor image being as an image to be projected on the virtual stereoscopic imaging plane 9 when the virtual stereoscopic projection plane 7 is viewed from the virtual camera 8, by transferring the each picture element of the camera image data onto the virtual stereoscopic imaging plane 9 of the virtual camera 8 according to the coordinate transformation; and displaying on a monitor a synthesis image in which a downward image of the close view and a perspective image of an intermediate view to the distant view projected by the generated monitor image data are synthesized, are included. Therefore, it is possible to provide the image generating method which generates the monitor image data in which the downward display for the close view and the perspective display from the intermediate-to-distant view are seamlessly joined, while simplifying calculation processes, eliminating a perspective occurring on the virtual stereoscopic projection plane 7; and obtaining an extremely high flexibility on the viewpoint transformation by setting the virtual camera 8, the virtual stereoscopic projection plane 7, and the virtual stereoscopic imaging plane 9.

As described above, the image generating apparatus and method of the present invention have been described based on the Embodiment 1; however, a specific configuration is not limited to the Embodiment 1. Various changes or additions are tolerated without departing from the scope of the invention according to each claim of the patent claims.

In the Embodiment 1, a preferable example has been described, in which the virtual projection plane has been assumed to be the virtual stereoscopic projection plane, and in which the virtual imaging plane has been assumed to be the virtual stereoscopic imaging plane. However, the virtual imaging plane may be a flat imaging plane, and only the virtual projection plane may be assumed to be the virtual stereoscopic projection plane. That is, as the virtual projection plane, as long as the virtual stereoscopic projection plane is one including the close view screen set on the ground, and the distant view screen being connected to a portion of the close view screen far from the real camera and set at a predetermined upward tilt angle, it is not limited to one in the Embodiment 1.

In the Embodiment 1, the single rear camera is disposed, and the coordinate transformation is performed on the position of each picture element of the single piece of the camera image data captured by the single rear camera, so that monitor image data are generated. This is to clarify a feature of the invention, which uses the single piece of camera image data from the real camera, so only the single in-vehicle camera has been used in the Embodiment 1. Accordingly, the description of the Embodiment 1 is not to limit the number of cameras to only one, but one real camera and one or a plurality of auxiliary cameras may be disposed. For example, on the downward image, there are some cases that images on dead zones (both ends) are missed, and in this case, the images on dead zones may be compensated by using an image from another in-vehicle camera (auxiliary camera).

In the Embodiment 1, as the monitor display image, the image has been produced by seamlessly jointing the downward display image of the close view and the perspective display image from the intermediate-to-distant view. However, for example, the monitor display image may be one which a partition line is provided between the downward display image of the close view and the perspective display image from the intermediate-to-distant view. That is, the present invention is to generate the monitor image data with which the overhead display image of the close view and the perspective display image from the intermediate-to-distant view are seamlessly jointed, and not to define a condition of joining, even to the extent of, the monitor display images generated based on the monitor image data. For example, considering visibility, design, and the like, the overhead image and the perspective image based on the generated monitor image data are incorporated into a base image on which a partition line, a frame, and the like are formed in advance, and the synthesis image of both images may be displayed on the monitor.

In the Embodiment 1, as an imaging device of the real camera, the CCD has been used, but a CMOS and the like may be used instead.

In the Embodiment 1, an example of applying it to the rear camera mounted on a vehicle has been described. However, it can be also applied to a side camera or a front camera to be mounted on the vehicle. In addition, it can be applied to a monitoring camera disposed in a store or the like other than on the vehicle. When it is applied to the monitoring camera, great advantage exists in that the number of cameras and monitors to be disposed can be reduced to a large extent.

What is claimed is:

1. An image generating apparatus, comprising:
    a single real camera which captures camera image data projected onto a single real imaging plane and ranging from a close view to a distant view; and
    an image processing controller
    which sets a single virtual camera at a position higher than the single real camera,
    which sets, on an optical axis of the single real camera, a virtual stereoscopic projection plane, as a virtual projection plane from the single virtual camera, formed in a stereoscopic screen including a close view screen set on ground and a distant view screen being connected to a side of the close view screen far from the single real camera and set to have a predetermined upward tilt angle, an optical axis of the single virtual camera being disposed to be directed to the virtual stereoscopic projection plane,
    which sets a virtual stereoscopic imaging plane, as a virtual imaging plane of the single virtual camera, including a close view imaging plane parallel to the close view screen and a distant view imaging plane connected to a side of the close view imaging plane near from the single real camera and set to have a predetermined downward tilt angle,
    which performs a coordinate transformation between a position of each picture element of the single camera image data captured by the single real camera and a position of each picture element on the virtual imaging plane of the single virtual camera through the virtual stereoscopic projection plane,
    which transfers the each picture element of the camera image data onto the virtual stereoscopic imaging plane of the single virtual camera according to the coordinate transformation, and
    which generates, from the single camera image data captured by the single real camera, monitor image data for obtaining a monitor image, the monitor image being as an image to be projected on the virtual stereoscopic imaging plane when the virtual stereoscopic projection plane is viewed from the single virtual camera; and
    a monitor which displays a synthesis image in which a downward image of the close view and a perspective image of an intermediate view to the distant view projected by the monitor image data generated from the single camera image data captured by the single real camera by the image processing controller are seamlessly connected to be synthesized to have continuity in the synthesis image.

2. An image generating method, comprising:
    capturing camera image data projected onto a single real imaging plane of a single real camera and ranging from a close view to a distant view;
    setting a single virtual camera at a position higher than the single real camera;
    setting, on an optical axis of the single real camera, a virtual stereoscopic projection plane, as a virtual projection plane, formed in a stereoscopic screen including a close view screen set on ground and a distant view screen being connected to a side of the close view screen far from the single real camera and set to have a predetermined upward tilt angle, an optical axis of the single virtual camera being disposed to be directed to the virtual stereoscopic projection plane;
    performing a coordinate transformation between a position of each picture element of the single camera image data captured by the single real camera and a position of each picture element on a virtual imaging plane of the single virtual camera through the virtual stereoscopic projection plane;
    generating, from the single camera image data captured by the single real camera, monitor image data for obtaining a monitor image, the monitor image being as an image to be projected on the virtual imaging plane when the virtual stereoscopic projection plane is viewed from the single virtual camera, by transferring the each picture element of the camera image data onto the virtual imaging plane of the virtual camera according to the coordinate transformation; and
    displaying on a monitor a synthesis image in which a downward image of the close view and a perspective image of an intermediate view to the distant view projected by the monitor image data generated from the single camera image data captured by the single real camera are seamlessly connected to be synthesized to have continuity in the synthesis image.

3. The image generating method according to claim 2, wherein
    a mapping table is generated by performing a coordinate transformation of a position of each picture element in an order of:
    designating one position of the picture element on a virtual imaging plane of the single virtual camera;
    determining a first corresponding position on a virtual projection plane, corresponding to the designated one position of the picture element; and
    determining a second corresponding position on the imaging plane of the single real camera, corresponding to the first corresponding position, and
    wherein the method performs a coordinate transformation, by using the mapping table, between the position of the each picture element of the single camera image data captured by the single real camera and the position of the each picture element on the virtual imaging plane of the single virtual camera.

4. The image generating method according to claim 2, wherein a transformation relationship characteristic indicating a relationship between a distance of a picture element from an optical axis by a distorted image of the camera image data and a distance of a picture element from an optical axis by a non-distorted image of the camera image data is determined in advance, and wherein the method corrects a distortion of a coordinate system of the position of the each picture element of the single camera image data captured by the single real camera, by using the distance of the each picture element from the optical axis and the transformation relationship characteristic, to transform it into a coordinate system of the virtual imaging plane.

5. The image generating method according to claim 2, further comprising setting the single virtual camera on an arbitrary spatial position in accordance with an external operation to a virtual camera setting operation member.

6. The image generating method according to claim 2, further comprising setting an upward tilt angle of a screen for the distant view to a screen for the close view in accordance with an external operation to a virtual stereoscopic projection plane setting operation member.

7. The image generating method according to claim 2, further comprising setting a downward tilt angle of an imaging plane for the distant view to an imaging plane for the close view in accordance with an external operation to a virtual stereoscopic imaging plane setting operation member.

8. The image generating method according to claim 2, wherein the camera image data is captured by a rear camera attached to a rear part of a vehicle and which images a view behind the vehicle.

9. An image generating method, comprising:

capturing camera image data projected onto a single real imaging plane of a single real camera and ranging from a close view to a distant view;

setting a single virtual camera at a position higher than the single real camera;

setting, on an optical axis of the single real camera, a virtual stereoscopic projection plane, as a virtual projection plane from the virtual camera, formed in a stereoscopic screen including a close view screen set on ground and a distant view screen being connected to a side of the close view screen far from the single real camera and set to have a predetermined upward tilt angle, an optical axis of the single virtual camera being disposed to be directed to the virtual stereoscopic projection plane;

setting a virtual stereoscopic imaging plane, as a virtual imaging plane of the virtual camera, including a close view imaging plane parallel to the close view screen and a distant view imaging plane connected to a side of the close view imaging plane near from the single real camera and set to have a predetermined downward tilt angle;

performing a coordinate transformation between a position of each picture element of the single camera image data captured by the single real camera and a position of each picture element on the virtual stereoscopic imaging plane of the single virtual camera through the virtual stereoscopic projection plane;

generating, from the single camera image data captured by the single real camera, monitor image data for obtaining a monitor image, the monitor image being as an image to be projected on the virtual stereoscopic imaging plane when the virtual stereoscopic projection plane is viewed from the virtual camera, by transferring the each picture element of the camera image data onto the virtual stereoscopic imaging plane of the single virtual camera according to the coordinate transformation; and displaying on a monitor a synthesis image in which a downward image of the close view and a perspective image of an intermediate view to the distant view projected by the monitor image data generated from the single camera image data captured by the single real camera are seamlessly connected to be synthesized to have continuity in the synthesis image.

* * * * *